(12) United States Patent
Moustafa et al.

(10) Patent No.: US 12,052,378 B2
(45) Date of Patent: Jul. 30, 2024

(54) NETWORK-WIDE SUPERVISION IN A HIERARCHICALLY-SEGMENTED BLOCKCHAIN NETWORK

(71) Applicant: Optum Services (Ireland) Limited, Dublin (IE)

(72) Inventors: Karim Mahmoud Mohamed Moustafa, Dublin (IE); Harutyun Shahumyan, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 174 days.

(21) Appl. No.: 17/664,321

(22) Filed: May 20, 2022

(65) Prior Publication Data
US 2023/0379177 A1    Nov. 23, 2023

(51) Int. Cl.
*H04L 9/00*    (2022.01)

(52) U.S. Cl.
CPC ........................ *H04L 9/50* (2022.05)

(58) Field of Classification Search
CPC ............................................. H04L 9/50
See application file for complete search history.

(56) References Cited

U.S. PATENT DOCUMENTS

| | | |
|---|---|---|
| 10,366,204 B2 | 7/2019 | Tanner, Jr. et al. |
| 2002/0116240 A1* | 8/2002 | Hsuan ............... G06Q 30/0635 |
| | | 705/26.81 |

(Continued)

FOREIGN PATENT DOCUMENTS

| | | |
|---|---|---|
| AU | 2020101946 A4 | 10/2020 |
| AU | 2020102115 A4 | 10/2020 |

(Continued)

OTHER PUBLICATIONS

"Patient Estimates and Point-of-Service Collections Solutions," PMMC, (6 pages), (online), [Retrieved from the Internet Jul. 21, 2022] <URL: https://www.pmmconline.com/solutions/patient-estimates>.

(Continued)

*Primary Examiner* — John B King
(74) *Attorney, Agent, or Firm* — ALSTON & BIRD LLP

(57) ABSTRACT

Various embodiments of the present invention introduce techniques for efficient and resilient network-wide supervision of a hierarchically-segmented blockchain network. A hierarchically-segmented blockchain network may include S segment ledger systems associated with S network segments and G local ledger systems. In response, various embodiments of the present invention utilize a centralized global ledger monitoring system that non-persistently monitors the S+G monitored systems via periodic chaincodes that are configured to verify targeted transactions associated with particular local ledgers and/or segment-wise ledgers during particular transactional junctures associated with ledger data. In this way, by enabling targeted monitoring of a hierarchically-segmented blockchain network using a centralized global ledger monitoring system that non-persistently monitors the monitored systems via periodic chaincodes that are configured to verify targeted transactions in particular transactional junctures, various embodiments of the present invention introduce techniques for efficient and resilient network-wide supervision of a hierarchically-segmented blockchain network.

20 Claims, 12 Drawing Sheets

(56) References Cited

U.S. PATENT DOCUMENTS

| | | | |
|---|---|---|---|
| 2017/0075938 A1* | 3/2017 | Black | H04L 9/3239 |
| 2018/0197155 A1* | 7/2018 | Georgen | G06Q 20/065 |
| 2019/0132350 A1* | 5/2019 | Smith | G06F 21/60 |
| 2019/0172012 A1 | 6/2019 | Roy et al. | |
| 2019/0237169 A1 | 8/2019 | Culver et al. | |
| 2019/0266597 A1 | 8/2019 | Mohtar | |
| 2019/0339684 A1* | 11/2019 | Cella | G05B 19/41875 |
| 2019/0355472 A1 | 11/2019 | Kutzko | |
| 2019/0378094 A1 | 12/2019 | Quinn | |
| 2019/0392164 A1* | 12/2019 | Dutta | H04L 9/0825 |
| 2019/0394023 A1* | 12/2019 | Menon | H04L 9/3239 |
| 2020/0213089 A1* | 7/2020 | Yang | H04L 9/3265 |
| 2020/0310875 A1* | 10/2020 | Ragnoli | G06F 9/3877 |
| 2020/0380500 A1 | 12/2020 | Dershem | |
| 2021/0065113 A1* | 3/2021 | Wynter | H04L 9/50 |
| 2021/0090081 A1 | 3/2021 | Rege et al. | |

FOREIGN PATENT DOCUMENTS

| | | | |
|---|---|---|---|
| AU | 2020102635 A4 | | 11/2020 |
| CN | 116975061 A | * | 10/2023 |

OTHER PUBLICATIONS

"Price Transparency: Common Definitions," Association of American Medical Colleges, (2 pages), (online), [Retrieved from the Internet Jul. 21, 2022] <URL: https://www.aamc.org/system/files/c/2/450000-pricetran_commondefs.pdf>.

Ahmad, Nur Sufiza et al. "Drug Price Transparency Initiative: A Scoping Review," Research In Social and Administrative Pharmacy, vol. 16, No. 10, pp. 1359-1369, DOI: 10.1016/j.sapharm.2020.01.002.

Benavidez, Gilbert. "Price Transparency in Health Care Has Been Disappointing, But It Doesn't Have To Be," Journal of the American Medical Association, vol. 322, No. 13, Oct. 1, 2019, pp. 1243-1244.

Cernian, Alexandra et al. "PatientDataChain: A Blockchain-Based Approach To Integrate Personal Health Records," Sensors, vol. 20, No. 22, Nov. 16, 2020, pp. 1-24, DOI: 10.3390/s20226538.

Chen, Hannah S. et al. "Blockchain In Healthcare: A Patient-Centered Model," Biomedical Journal of Scientific & Technical Research, vol. 20, No. 3, Aug. 8, 2019, pp. 15017-15022, doi: 10.2617/BJSTR.2019.20.003448.

Dutta, Pankaj et al. "Blockchain Technology In Supply Chain Operations: Applications, Challenges and Research Opportunities," Transportation Research Part E, Logistics and Transportation Review, vol. 142, No. 102067, Aug. 18, 2020 (ePub: Sep. 29, 2020), pp. 1-33, DOI: 10.1016/j.tre.2020.102067.

Ejaz, Muneeb et al. "Health-BlockEdge: Blockchain-Edge Framework for Reliable Low-Latency Digital Healthcare Applications," Sensors, vol. 21, No. 7, pp. 1-22, DOI: 10.3390/s21072502.

Han, Ahreum et al. "The Impact of Public Reporting Schemes and Market Competition on Hospital Efficiency," Healthcare, vol. 9, No. 8:1031, Aug. 11, 2021, pp. 1-13, Multidisciplinary Digital Publishing Institute, DOI: 10.3390/healthcare9081031.

Hut, Nick. "CMS Is Preparing to Make Noncompliance With Price Transparency Requirements Much More Expensive," Healthcare Financial Management Association, Jul. 19, 2021, (5 pages), (article, online), [Retrieved from the Internet Jul. 21, 2022] <URL: https://www.hfma.org/topics/price-transparency/cms-is-preparing-to-make-noncompliance-with-price-transparency-r.html>.

Kordzadeh, Nima. "Toward Quality Transparency In Healthcare: Exploring Hospital-Operated Online Physician Review Systems In Northeastern United States," Health Policy and Technology, vol. 9, Issue 1, Mar. 2020, pp. 56-61, DOI: 10.1016/j.hlpt.2019.11.003.

Mackey, Tim K. et al. "Fit-For-Purpose?—Challenges and Opportunities For Applications Of Blockchain Technology In The Future of Healthcare," BMC Medicine, vol. 17, No. 68, Mar. 27, 2019, pp. 1-17, DOI: 10.1186/s12916-019-1296-7.

Omar, Ilhaam A. et al. "Automating Procurement Contracts In The Healthcare Supply Chain Using Blockchain Smart Contracts," IEEE Access, vol. 9, Feb. 26, 2021, pp. 37397-37409, DOI: 10.1109/ACCESS.2021.3062471.

Patel, Kunal N. "Hospital Charge and Pricing Transparency," A Doctoral Dissertation, The University of Alabama at Birmingham, (Year: 2020), (117 pages).

Taralunga, Dragos Daniel et al. "A Blockchain-Enabled Framework for mHealth Systems," Sensors, vol. 21, No. 8:2828, pp. 1-24, DOI: 10.3390/s21082828.

Whaley, Christopher et al. "Consumer Responses To Price Transparency Alone Versus Price Transparency Combined With Reference Pricing," American Journal of Health Economics, vol. 5, No. 2, Apr. 2019, pp. 1-40, DOI: 10.1162/ajhe_a_00118.

Wu, Sze-Jung et al. "Price Transparency For MRIs Increased Use Of Less Costly Providers And Triggered Provider Competition," Health Affairs, vol. 33, No. 8, Aug. 2014, pp. 1391-1398, DOI: 10.1377/hlthaff.2014.0168.

Yoo, Minjae et al. "A Study On The Transparent Price Tracking System In Supply Chain Management Based On Blockchain," Sustainability, vol. 10, No. 11: 4037, Nov. 4, 2018, pp. 1-15, DOI: 10.3390/su10114037.

* cited by examiner

NETWORK-WIDE SUPERVISION IN A HIERARCHICALLY-SEGMENTED BLOCKCHAIN NETWORK

BACKGROUND

Various embodiments of the present invention address technical challenges related to network-wide supervision of a blockchain network and disclose innovative techniques for efficiently and effectively supervising a blockchain network.

BRIEF SUMMARY

In general, various embodiments of the present invention provide methods, apparatus, systems, computing devices, computing entities, and/or the like for enabling low-bottleneck network-wide supervision of a local ledger server system in a hierarchically-segmented blockchain network that is associated with a plurality of network levels.

In accordance with one aspect, a method is provided. In one embodiment, the method comprises: identifying a plurality of segment ledger systems associated with a plurality of network segments for the local ledger server system, wherein each network segment is associated with a respective network level of the plurality of network levels of the hierarchically-segmented blockchain network; identifying a service entry that is associated with one or more service fields, wherein (i) each service field is associated with a service type of a plurality of defined service types, and (ii) each service field is associated with a service output cost measure of one or more service output cost measures associated with the service entry; generating a service ledger entry for the service entry in a local service ledger of the local ledger server system; subsequent to generating the service ledger entry: for each service field, receiving, from the plurality of segment ledger systems, a plurality of service output cost distribution measures for the plurality of network levels, generating a plurality of relative service output cost measures with respect to the plurality of network levels based at least in part on the plurality of service output cost distribution measures, and generating a service endpoint document data object that describes the plurality of relative service output cost measures, wherein, in response to generation of the service endpoint document data object, a global ledger monitoring system in the hierarchically-segmented blockchain network is configured to execute an output cost distribution validation chaincode to endorse the service endpoint document data object and cause generation of a service endpoint ledger entry for the service endpoint document data object in a local service endpoint ledger of the local ledger server system; and subsequent to generating the service endpoint ledger entry, providing the one or more service output cost measures to the plurality of segment ledger systems, wherein: (i) in response to receipt of the one or more service output cost measures by a respective segment ledger system, the global ledger monitoring system is configured to execute a respective level-specific service cost validation chaincode to cause updating of segment-wide service output cost distribution measures for each service type that is associated with the service entry with respect to the network segment that is associated with the respective segment ledger system, and (ii) each segment ledger system is configured to perform one or more segment management operations based at least in part on the segment-wide service output cost distribution measures that are maintained by the segment ledger system.

In accordance with another aspect, a computer program product is provided. The computer program product may comprise at least one computer-readable storage medium having computer-readable program code portions stored therein, the computer-readable program code portions comprising executable portions configured to: identify a plurality of segment ledger systems associated with a plurality of network segments for the local ledger server system, wherein each network segment is associated with a respective network level of the plurality of network levels of the hierarchically-segmented blockchain network; identify a service entry that is associated with one or more service fields, wherein (i) each service field is associated with a service type of a plurality of defined service types, and (ii) each service field is associated with a service output cost measure of one or more service output cost measures associated with the service entry; generate a service ledger entry for the service entry in a local service ledger of the local ledger server system; subsequent to generating the service ledger entry: for each service field, receive, from the plurality of segment ledger systems, a plurality of service output cost distribution measures for the plurality of network levels, generate a plurality of relative service output cost measures with respect to the plurality of network levels based at least in part on the plurality of service output cost distribution measures, and generate a service endpoint document data object that describes the plurality of relative service output cost measures, wherein, in response to generation of the service endpoint document data object, a global ledger monitoring system in the hierarchically-segmented blockchain network is configured to execute an output cost distribution validation chaincode to endorse the service endpoint document data object and cause generation of a service endpoint ledger entry for the service endpoint document data object in a local service endpoint ledger of the local ledger server system; and subsequent to generating the service endpoint ledger entry, provide the one or more service output cost measures to the plurality of segment ledger systems, wherein: (i) in response to receipt of the one or more service output cost measures by a respective segment ledger system, the global ledger monitoring system is configured to execute a respective level-specific service cost validation chaincode to cause updating of segment-wide service output cost distribution measures for each service type that is associated with the service entry with respect to the network segment that is associated with the respective segment ledger system, and (ii) each segment ledger system is configured to perform one or more segment management operations based at least in part on the segment-wide service output cost distribution measures that are maintained by the segment ledger system.

In accordance with yet another aspect, an apparatus comprising at least one processor and at least one memory including computer program code is provided. In one embodiment, the at least one memory and the computer program code may be configured to, with the processor, cause the apparatus to: identify a plurality of segment ledger systems associated with a plurality of network segments for the local ledger server system, wherein each network segment is associated with a respective network level of the plurality of network levels of the hierarchically-segmented blockchain network; identify a service entry that is associated with one or more service fields, wherein (i) each service field is associated with a service type of a plurality of defined service types, and (ii) each service field is associated with a service output cost measure of one or more service output cost measures associated with the service entry; generate a service ledger entry for the service entry in a local service ledger of the local ledger server system; subsequent to generating the service ledger entry: for each service field, receive, from the plurality of segment ledger systems, a plurality of service output cost distribution measures for the plurality of network levels, generate a plurality of relative service output cost measures with respect to the plurality of network levels based at least in part on the plurality of service output cost distribution measures, and generate a service endpoint document data object that describes the plurality of relative service output cost measures, wherein, in response to generation of the service endpoint document data object, a global ledger monitoring system in the hierarchically-segmented blockchain network is configured to execute an output cost distribution validation chaincode to endorse the service endpoint document data object and cause generation of a service endpoint ledger entry for the service endpoint document data object in a local service endpoint ledger of the local ledger server system; and subsequent to generating the service endpoint ledger entry, provide the one or more service output cost measures to the plurality of segment ledger systems, wherein: (i) in response to receipt of the one or more service output cost measures by a respective segment ledger system, the global ledger monitoring system is configured to execute a respective level-specific service cost validation chaincode to cause updating of segment-wide service output cost distribution measures for each service type that is associated with the service entry with respect to the network segment that is associated with the respective segment ledger system, and (ii) each segment ledger system is configured to perform one or more segment management operations based at least in part on the segment-wide service output cost distribution measures that are maintained by the segment ledger system.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
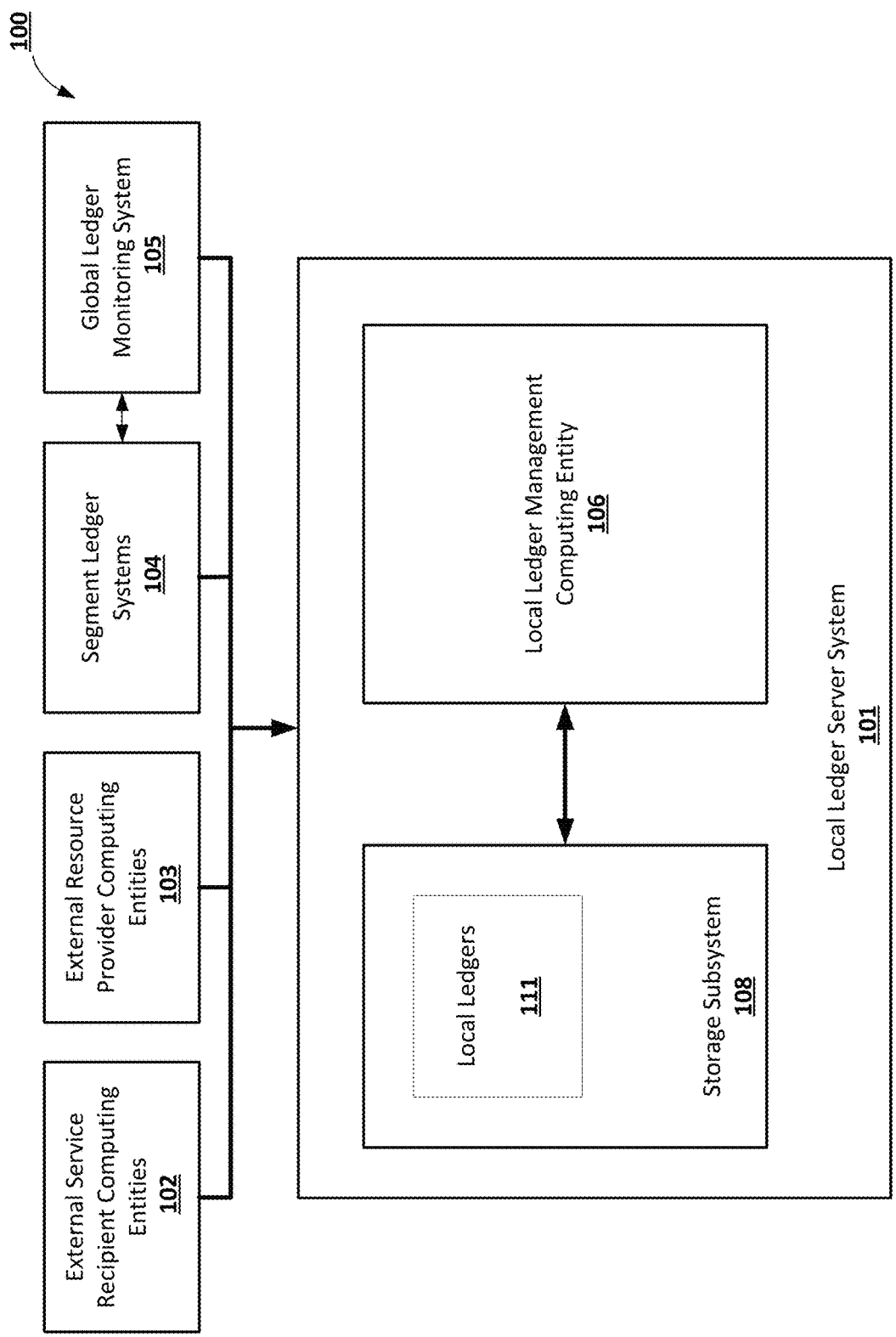
FIG. 1 provides an exemplary overview of an architecture that can be used to practice embodiments of the present invention.

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to a medical service provider/healthcare provider-related blockchain network, one of ordinary skill in the art will recognize that the disclosed concepts can be used in other blockchain networks.

I. OVERVIEW AND TECHNICAL ADVANTAGES

Various embodiments of the present invention introduce techniques for efficient and resilient network-wide supervision of a hierarchically-segmented blockchain network. A hierarchically-segmented blockchain network may include S segment ledger systems associated with S network segments and G local ledger systems (also referred to a local ledger server systems). In some embodiments, persistent network-wide supervision of such a complex network would either require a single global ledger monitoring system that would persistently communicate with S+G monitored systems, or up to S+G monitoring systems each performing network-wide supervision for a subset of the S+G monitored systems, where the monitoring systems need to be in persistent communications to exchange configuration data. As clear, both solutions involve considerable network overhead which, in addition to using an excessive amount of network resources, increases the probability of network failure given a constant per-packet network failure probability. In contrast, various embodiments of the present invention utilize a centralized global ledger monitoring system that non-persistently monitors the S+G monitored systems via periodic chaincodes that are configured to verify targeted transactions associated with particular local ledgers and/or segment-wise ledgers during particular transactional junctures associated with ledger data. In this way, by enabling targeted monitoring of a hierarchically-segmented blockchain network using a centralized global ledger monitoring system that non-persistently monitors the monitored systems via periodic chaincodes that are configured to verify targeted transactions in particular transactional junctures, various embodiments of the present invention introduce techniques for efficient and resilient network-wide supervision of a hierarchically-segmented blockchain network.

An exemplary application of various embodiments of the present invention relates to a hierarchically-segmented blockchain network that is configured to generate, for a healthcare event: (i) measures describing a cost of a service paid by others at different applicability levels (e.g., ServC2O measures) based at least in part on response data received from a set of external ledgers each associated with a distinct applicability level, and (ii) a measure comparing asset cost to service cost during the event (e.g., a SupC2C measure) based at least in part on data in a local asset leger comprising asset leger entries generated by asset suppliers in response to asset acquisitions. In some embodiments, improving price transparency for rendered healthcare services based at least in part on generating price transparency measures using blockchains, or generally distributed ledgers. In particular, the Blockchain Pricing concepts involve generating at least a Medical Supplies Charges to Cost Ratio (SupC2C) measure and a Service Cost to Others Ratio (SerC2O) measure for a healthcare encounter and may generate said measures using county-level data and/or state-level data. Key benefits that result from these concepts include improved accuracy, fairness, and transparency of healthcare service prices for payers and patients, thereby reducing resources expended in conflict over unexpected pricing and improving compliance with relevant pricing transparency legislation.

In some embodiments, the following operations are performed: for an event comprising one or more healthcare services rendered to a patient, generating a service ledger entry for each healthcare service in a local service ledger; for each healthcare service, transmit a request for a first ServC2O measure with a first applicability level and a second ServC2O measure with a second applicability level; receiving a response from the one or more external ledgers each associated with an applicability level; and submitting an event ledger entry for the event to a public event ledger, where the event ledger entry includes one or more composite ServC2O measures generated based at least in part on the first ServC2O measure and the second ServC2O measure for each healthcare service of the event. In some embodiments, the following operations are performed: generating an event asset list for an event in which one or more assets are used to render healthcare services to a patient; accessing a local asset ledger comprising asset ledger entries generated by asset suppliers responsive to asset acquisitions; and submitting an event ledger entry for the event to a public event ledger based on generating a SupC2C measure for the event ledger entry using the local asset ledger and the event asset list.

II. DEFINITIONS OF CERTAIN TERMS

The term "hierarchically-segmented blockchain network" may refer to a data entity that describes a network comprising a set of local ledger server systems, a global ledger monitoring system, and a set of segment ledger systems each associated with a network segment of S network segments. In some embodiments, the S network segments are associated with L network levels, such that each local ledger server system is associated with L network segments each being associated with a network level of the L network levels. In some embodiments, given a non-zero positive integer i, each network segment that is associated with an ith network level is hierarchically dependent on a "parent" network segment that is associated with an (i−1)th network level, with the zeroth network level being the highest network level. For example, given which L=2, the zeroth network level may be a state network level and the first network level may be a county network level. Accordingly, in the noted exemplary embodiment, each county-related network segment is associated with a first network level and is a "child" network segment of a state-related network segment that is associated with a zeroth network level. Moreover, in the noted exemplary embodiment, each local ledger server system (e.g., which may be a local ledger server system that is associated with a medical provider) is associated with a county-related network segment and a state-related network segment. Thus, given L=2, the local ledger server system is associated with two network segments each being associated with one of the two defined network levels, where the two defined network levels have a hierarchical relationship as discussed above.

The term "service entry" may refer to a data entity that describes one or more services associated with a local ledger server system, such as one or more services performed using the operational resources provided by the local ledger server system. For example, the service entry may describe one or more medical services performed by a medical service provider associated with the local ledger server system for a patient. In this example, each medical service performed by the medical service provider may be described by a "service field," while each medical asset used by the medical service provider to perform one or more medical services with respect to the particular patient may be described by a "resource field." Accordingly, service fields and resource fields may be data fields by described by a service entry that describe service types and/or resource types used by the local ledger server system while performing particular defined services. Examples of service types include a flu vaccine injection service type, an emergency room visit service type, and/or a medical resonance imaging service type. Examples of resource types include a blood filter resource type and/or an immobilizer resource type. In some embodiments, a service field is associated with an output cost that describes the cost of the service field as provided to one or more external service recipient entities (e.g., one or more patients, one or more patient payers, one or more patient devices, and/or one or more payer devices). An example of an output cost for a service field is the price of a medical service corresponding to the service field. In some embodiments, a resource field is associated with both an input cost that describes the cost of the resource field as provided by one or more external resource provider entities (e.g., one or more asset suppliers and/or one or more asset supplier devices), as well as an output cost that describes the cost of the service field as provided to one or more external service recipient entities (e.g., one or more patients, one or more patient payers, one or more patient devices, and/or one or more payer devices). An example of an input cost for a resource field is the cost of purchasing a medical asset corresponding to the resource field. An example of an output cost for a resource field is the price for the medical asset corresponding to the resource field as charged to the patient and/or to the patient's payer.

The term "local ledger server system" may refer to a data entity that describes a system storing and maintaining a set of local ledgers that enable a local ledger management computing entity to perform transactional management operations in a hierarchically-segmented blockchain network by interacting with external systems (e.g., external service recipient systems, external resource provider systems, and/or a set of segment ledger systems) and under external supervision of a global ledger monitoring system.

In some embodiments, the set of local ledgers stored and maintained by the local ledger server system include a local service ledger, a local service endpoint ledger, and a local resource ledger. In some embodiments, the local ledgers enable the local ledger management computing entity to communicate with the global ledger monitoring system to enable the global ledger monitoring system to execute validation chaincodes that enable external supervision of the hierarchically-segmented blockchain network by the global ledger monitoring system. In some embodiments, each local ledger stored and maintained by the local ledger server system stores data associated with a latest state of a service entry and/or a resource entry that is being processed via a transactional pipeline characterized by a sequence of transactional pipeline junctions at a corresponding transactional pipeline junction. For example, the local service ledger may store service ledger entries that describe service entries before any processing by the transactional pipeline. As another example, the local service endpoint ledger may store service endpoint ledger entries that describes service endpoint documentation data objects that correspond to data obtained by processing the service entries via the transactional pipeline before presenting the data to the relevant external service recipient systems. As a further example, the local resource ledger may store resource ledger entries that describe smart contract transactional protocol data units for resource types as provided by external resource provider systems.

The term "local service ledger" may refer to data entity that describes a ledger maintained by a local ledger server system that describes a set of service ledger entries each corresponding to a corresponding service entry. In some embodiments, given L network levels of a hierarchically-segmented blockchain network, once a service ledger entry for a service entry is created, L relative service output cost measures are then generated for the service entry, where each service output cost measure corresponds to a respective network level. Then, the L relative service output cost measures are added to a data entity known as a service endpoint document data object, where the service endpoint document data object may describe data (e.g., invoice data) associated with a service entry for presentation to an external service recipient system including the L relative service output cost measures for the corresponding service entry. In some embodiments, once the service endpoint document data object for a service entry is generated, a global ledger monitoring system in the hierarchically-segmented blockchain network executes an output cost distribution validation chaincode to endorse the service endpoint document data object and cause generation of a service endpoint ledger entry for the service endpoint document data object in a local service endpoint ledger of a local ledger server system. Each entry of a service ledger is referred to herein as a service ledger entry.

The term "service output cost distribution measure" may refer to a data entity that describes a centroid distribution measure (e.g., a mean measure) of service output cost measures for service fields of a corresponding service type in a respective network segment. In some embodiments, given a hierarchically-segmented blockchain network that comprises S network segments, and further given T service types, the hierarchically-segmented blockchain network is associated with T*S service output cost distribution measures, where each segment ledger system that is associated with a respective network segment computes T service output cost distribution measures for T service types, and where the service output cost distribution measure for a particular service type and a particular network segment is determined based at least in part on a centroid distribution measure of service output cost measures for those service fields that are reported by the local ledger server systems in the particular network segment and that are associated with the particular service type. An example of a service output cost distribution measure is an average price of service fields for emergency room visit in a particular county. Another example of a service output cost distribution measure is an average price of service fields for emergency room visit in a particular state. In some embodiments, for a service field that is associated with F service fields and thus F corresponding service types, a local ledger server system obtains L*F service output cost distribution measures from the L segment ledger systems that are associated with the local ledger server system, where L describes a number of network levels of a hierarchically-segmented blockchain network within which the local ledger server system is located. In some of the noted embodiments, given a county network level and a state network level, and given two service fields $F_1$ and $F_2$, a local ledger server system obtains: (i) from the segment ledger system for the county that is associated with the local ledger server system, one county-level service output cost distribution measure for $F_1$ and one county-level service output cost distribution measure for $F_2$, and (ii) from the segment ledger system for the state that is associated with the local ledger server system, one state-level service output cost distribution measure for $F_1$ and one state-level service output cost distribution measure for $F_2$.

The term "relative service output cost measure" may refer to a data entity that describes a relationship between a magnitude of service output cost distribution measures for service fields of a corresponding service entry as determined in relation to a corresponding network level and the service output cost measures for the service fields of a corresponding service entry. For example, in some embodiments, given a service entry that is associated with F service fields and thus F corresponding service types, a local ledger server system that is associated with L network segments each associated with one of L network levels of a corresponding hierarchically-segmented blockchain network may generate L relative service output cost measures for the service entry, with each relative service output cost measure being associated with a respective network level (e.g., a county-level relative service output cost measure, a state-level relative service output cost measure, and/or the like). In some embodiments, to generate the relative service output cost measure for a particular service entry with respect to a particular network level, the local ledger server system: (i) retrieves F service output cost distribution measures for the F service types from the particular network level from the segment ledger system that is associated with the local ledger server system on the particular network level, (ii) for each service field, generates a field-wise output cost ratio based at least in part on the service output cost measure for the service field and the service output cost distribution measure for the service type of the service field (e.g., based at least in part on the ratio of the service output cost measure for the service field and the service output cost distribution measure for the service type of the service field), (iii) for each service field, generates a field-wise weighted relative output cost measure based at least in part on the field-wise output cost ratio for the service field and the service output cost measure for the service field (e.g., by multiplying the field-wise output cost ratio for the service field and the service output cost measure for the service field), and (iv) generates the relative service output cost measure based at least in part on each of the T field-wise weighted relative output cost measures resulting from operation (iii) (e.g. by summing up the relative service output cost measure based at least in part on each of the T field-wise weighted relative output cost measures resulting from operation). In some embodiments, given L network levels of a hierarchically-segmented blockchain network, each service entry generated by a local ledger server system in the hierarchically-segmented blockchain network is associated with L relative service output cost measures regardless of the number of service fields associated with the noted service entry.

The term "relative resource output cost measure" may refer to a data entity that describes relationships between resource input cost measures and resource output cost measures for R resource fields of a resource entry. For example, in some embodiments, to generate the relative resource output cost measure for a resource entry that is associated with R resource fields, a local ledger server system: (i) for each resource field, queries the local resource ledger for the resource type that is associated with the resource field to generate a resource input cost measure for the resource field, (ii) generates an aggregate input resource cost measure based at least in part on (e.g., by summing) each resource input cost measure, (iii) generates an aggregate output resource cost measure based at least in part on (e.g., by summing) each resource output cost measure for the one or more resource fields, and (iv) generates the relative resource output cost measure based at least in part on the aggregate input resource cost measure and the aggregate output resource cost measure.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for enabling low-bottleneck network-wide supervision of a local ledger server system 101 in a hierarchically-segmented blockchain network that is associated with a plurality of network levels. An example application of various embodiments of the present invention relates to a hierarchically-segmented blockchain network that is configured to generate, for a healthcare event: (i) measures describing a cost of a service paid by others at different applicability levels (e.g., ServC2O measures) based at least in part on response data received from a set of external ledgers each associated with a distinct applicability level, and (ii) a measure comparing asset cost to service cost during the event (e.g., a SupC2C measure) based at least in part on data in a local asset leger comprising asset leger entries generated by asset suppliers in response to asset acquisitions. In some embodiments, improving price transparency for rendered healthcare services based at least in part on generating price transparency measures using blockchains, or generally distributed ledgers. In particular, the Blockchain Pricing concepts involve generating at least a Medical Supplies Charges to Cost Ratio (SupC2C) measure and a Service Cost to Others Ratio (SerC2O) measure for a healthcare encounter and may generate said measures using county-level data and/or state-level data. Key benefits that result from these concepts include improved accuracy, fairness, and transparency of healthcare service prices for payers and patients, thereby reducing resources expended in conflict over unexpected pricing and improving compliance with relevant pricing transparency legislation.

In some embodiments, local ledger server system 101 may communicate with at least one of the external service recipient computing entities 102, external resource provider computing entities 103, segment ledger systems 104, and/or global ledger monitoring system 105 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The local ledger server system 101 may include a local ledger management computing entity 106 and a storage subsystem 108. The storage subsystem 108 may be configured to store one or more local ledgers. The storage subsystem 108 may also be configured to store input data used by the local ledger management computing entity 106 to facilitate low-bottleneck network-wide supervision of a local ledger server system 101 in a hierarchically-segmented blockchain network. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Local Ledger Management Computing Entity

Figure 2:
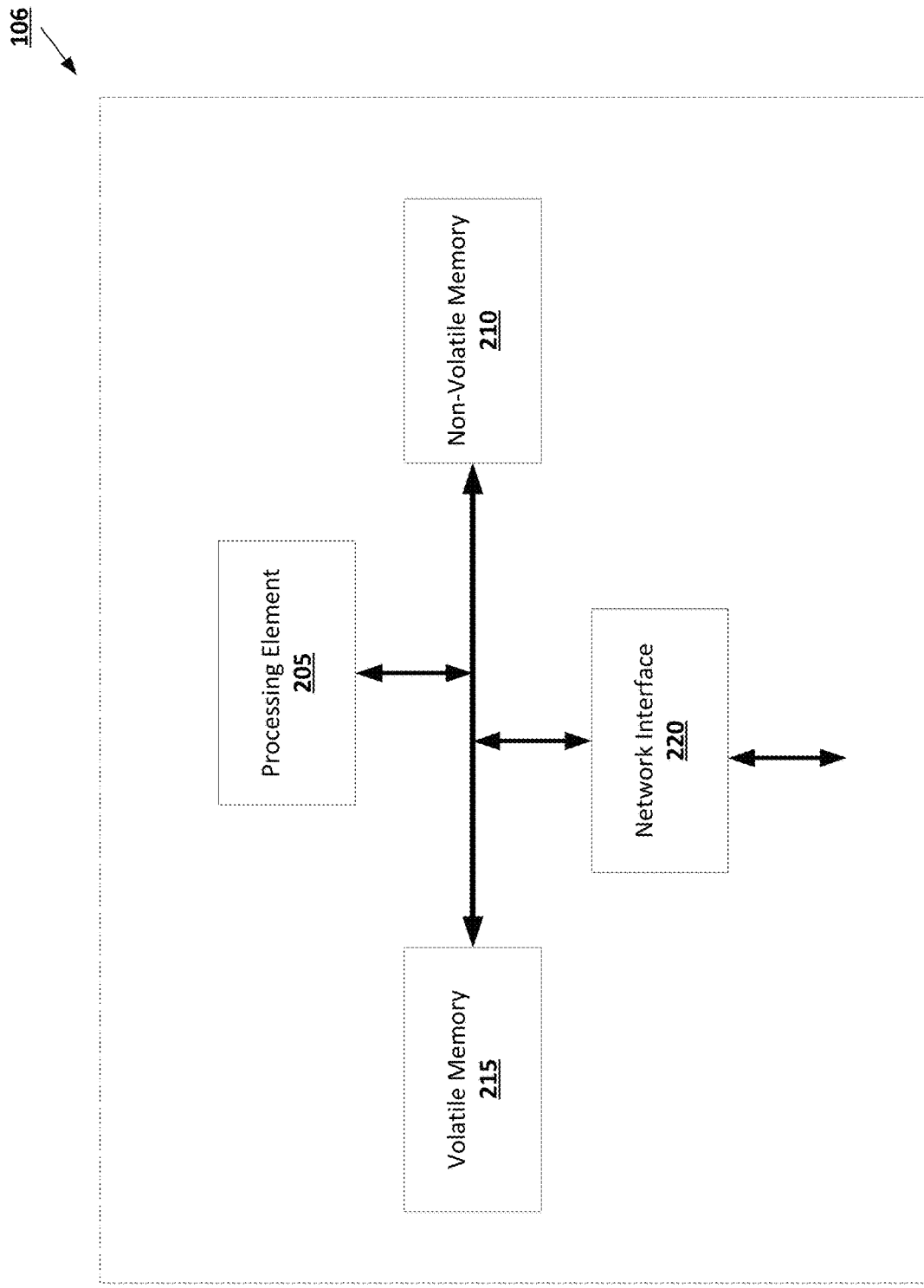
FIG. 2 provides an example local ledger management computing entity in accordance with some embodiment discussed herein.

FIG. 2 provides a schematic of a local ledger management computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the local ledger management computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the local ledger management computing entity 106 may include, or be in communication with, one or more processing elements 205 (also referred to as processors, processing circuitry, and/or similar terms used herein interchangeably) that communicate with other elements within the local ledger management computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the local ledger management computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the local ledger management computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the local ledger management computing entity 106 with the assistance of the processing element 205 and operating system.

As indicated, in one embodiment, the local ledger management computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the local ledger management computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the local ledger management computing entity 106 may include, or be in communication with, one or more input elements, such as a keyboard input, a mouse input, a touch screen/display input, motion input, movement input, audio input, pointing device input, joystick input, keypad input, and/or the like. The local ledger management computing entity 106 may also include, or be in communication with, one or more output elements (not shown), such as audio output, video output, screen/display output, motion output, movement output, and/or the like.

Exemplary External Service Recipient Computing Entity

Figure 3:
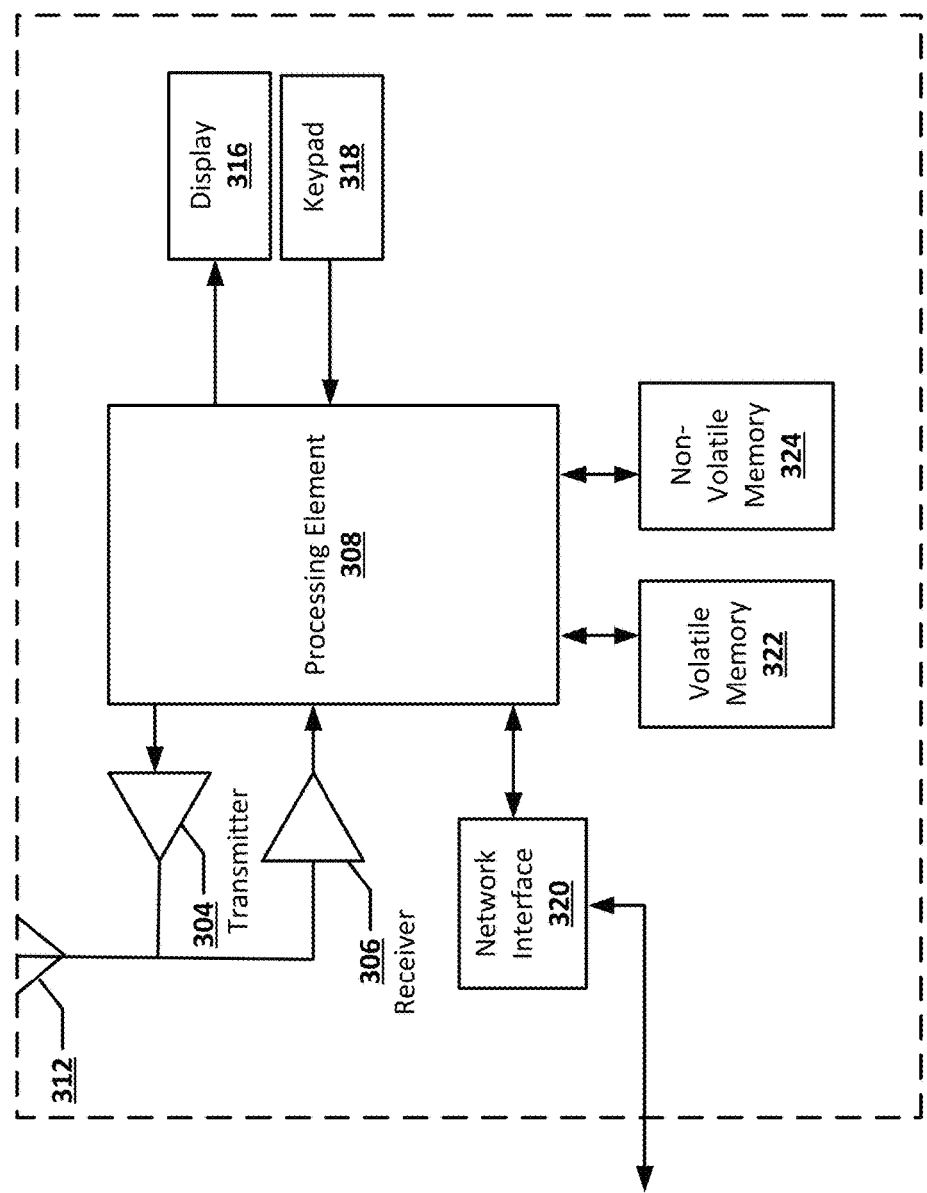
FIG. 3 provides an example external service recipient computing entity in accordance with some embodiments discussed herein.

FIG. 3 provides an illustrative schematic representative of an external service recipient computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External service recipient computing entities 102 can be operated by various parties. As shown in FIG. 3, the external service recipient computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external service recipient computing entity 102 may be capable of operating with one or more air interface standards, communication protocols, modulation types, and access types. More particularly, the external service recipient computing entity 102 may operate in accordance with any of a number of wireless communication standards and protocols, such as those described above with regard to the local ledger management computing entity 106. In a particular embodiment, the external service recipient computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external service recipient computing entity 102 may operate in accordance with multiple wired communication standards and protocols, such as those described above with regard to the local ledger management computing entity 106 via a network interface 320.

Via these communication standards and protocols, the external service recipient computing entity 102 can communicate with various other entities using concepts such as Unstructured Supplementary Service Data (US SD), Short Message Service (SMS), Multimedia Messaging Service (MMS), Dual-Tone Multi-Frequency Signaling (DTMF), and/or Subscriber Identity Module Dialer (SIM dialer). The external service recipient computing entity 102 can also download changes, add-ons, and updates, for instance, to its firmware, software (e.g., including executable instructions, applications, program modules), and operating system.

According to one embodiment, the external service recipient computing entity 102 may include location determining aspects, devices, modules, functionalities, and/or similar words used herein interchangeably. For example, the external service recipient computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external service recipient computing entity's 102 position in connection with a variety of other systems, including cellular towers, Wi-Fi access points, and/or the like. Similarly, the external service recipient computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external service recipient computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external service recipient computing entity 102 to interact with and/or cause display of information/data from the local ledger management computing entity 106, as described herein. The user input interface can comprise any of a number of devices or interfaces allowing the external service recipient computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external service recipient computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external service recipient computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external service recipient computing entity 102. As indicated, this may include a user application that is resident on the entity or accessible through a browser or other user interface for communicating with the local ledger management computing entity 106 and/or various other computing entities.

In another embodiment, the external service recipient computing entity 102 may include one or more components or functionality that are the same or similar to those of the local ledger management computing entity 106, as described in greater detail above. As will be recognized, these architectures and descriptions are provided for exemplary purposes only and are not limiting to the various embodiments.

In various embodiments, the external service recipient computing entity 102 may be embodied as an artificial intelligence (AI) computing entity, such as an Amazon Echo, Amazon Echo Dot, Amazon Show, Google Home, and/or the like. Accordingly, the external service recipient computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Exemplary External Resource Provider Computing Entity

Figure 4:
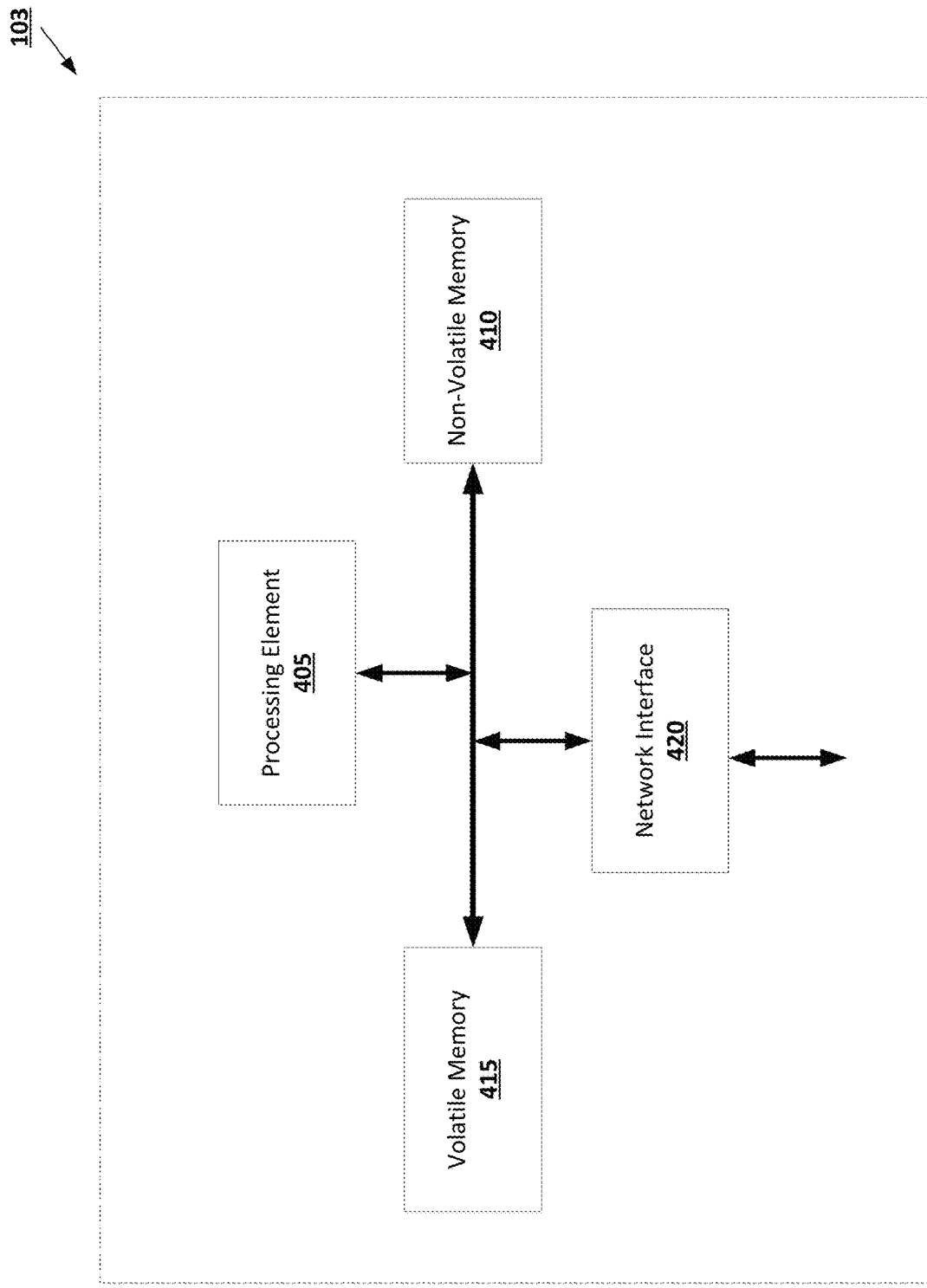
FIG. 4 provides an example external resource provider computing entity in accordance with some embodiments discussed herein.

FIG. 4 provides a schematic of an external resource provider computing entity 103 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the external resource provider computing entity 103 may also include one or more communications interfaces 420 for communicating with various computing entities, such as by communicating data, content, information, and/or similar terms used herein interchangeably that can be transmitted, received, operated on, processed, displayed, stored, and/or the like.

As shown in FIG. 4, in one embodiment, the external resource provider computing entity 103 may include, or be in communication with, one or more processing elements 405 (also referred to as processors, processing circuitry, and/or similar terms used herein interchangeably) that communicate with other elements within the external resource provider computing entity 103 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present invention when configured accordingly.

In one embodiment, the external resource provider computing entity 103 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 410, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the external resource provider computing entity 103 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 415, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405.

Thus, the databases, database instances, database management systems, data, applications, programs, program modules, scripts, source code, object code, byte code, compiled code, interpreted code, machine code, executable instructions, and/or the like may be used to control certain aspects of the operation of the external resource provider computing entity 103 with the assistance of the processing element 405 and operating system.

As indicated, in one embodiment, the external resource provider computing entity 103 may also include one or more communications interfaces 420 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the external resource provider computing entity 103 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the external resource provider computing entity 103 may include, or be in communication with, one or more input elements, such as a keyboard input, a mouse input, a touch screen/display input, motion input, movement input, audio input, pointing device input, joystick input, keypad input, and/or the like. The external resource provider computing entity 103 may also include, or be in communication with, one or more output elements (not shown), such as audio output, video output, screen/display output, motion output, movement output, and/or the like.

Exemplary Segment Ledger System

Figure 5:
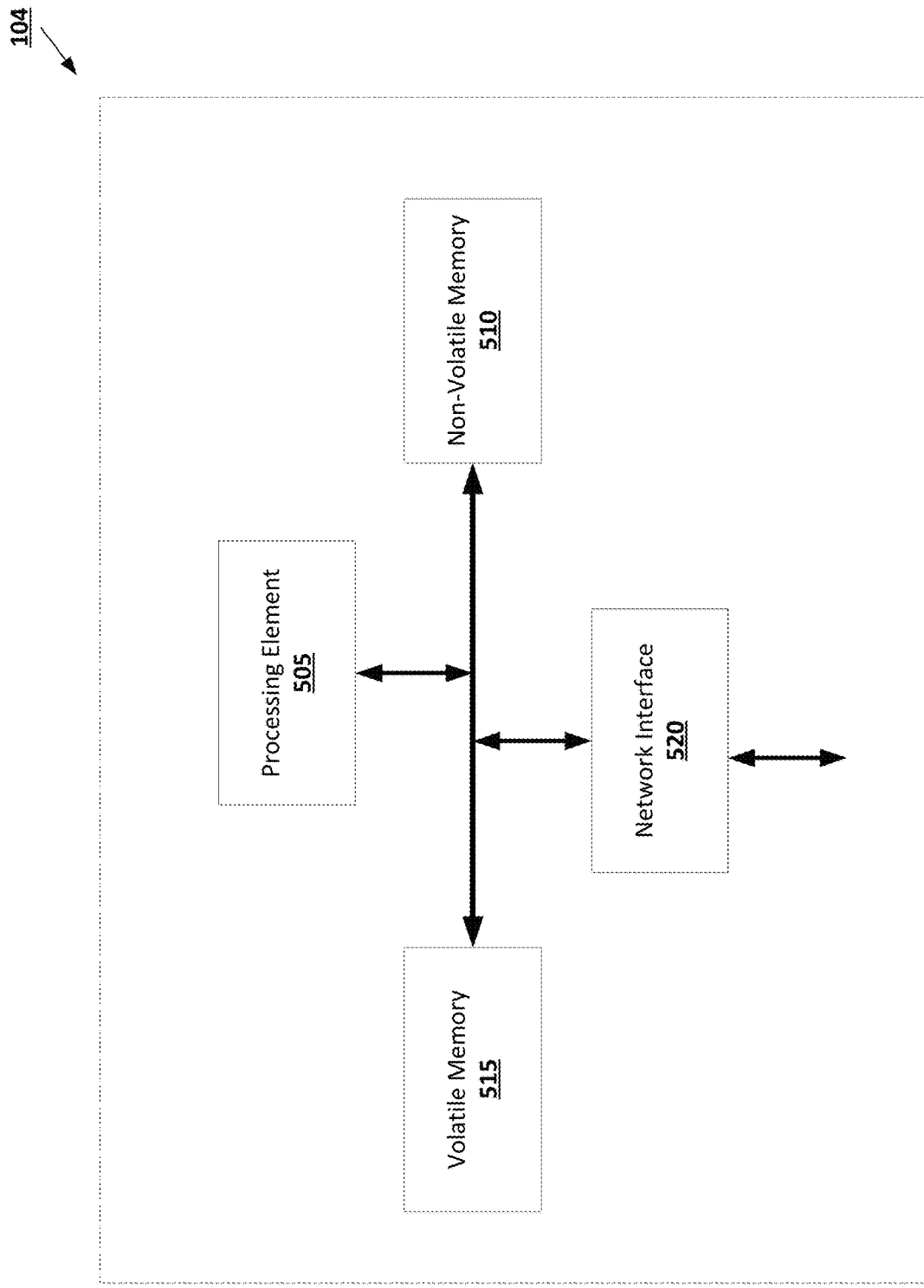
FIG. 5 provides an example segment ledger system in accordance with some embodiments discussed herein.

FIG. 5 provides a schematic of a segment ledger system 104 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the segment ledger system 104 may also include one or more communications interfaces 520 for communicating with various computing entities, such as by communicating data, content, information, and/or similar terms used herein interchangeably that can be transmitted, received, operated on, processed, displayed, stored, and/or the like.

As shown in FIG. 5, in one embodiment, the segment ledger system 104 may include, or be in communication with, one or more processing elements 505 (also referred to as processors, processing circuitry, and/or similar terms used herein interchangeably) that communicate with other elements within the segment ledger system 104 via a bus, for example. As will be understood, the processing element 505 may be embodied in a number of different ways.

For example, the processing element 505 may be embodied as one or more complex programmable logic devices (CPLDs), microprocessors, multi-core processors, coprocessing entities, application-specific instruction-set processors (ASIPs), microcontrollers, and/or controllers. Further, the processing element 505 may be embodied as one or more other processing devices or circuitry. The term circuitry may refer to an entirely hardware embodiment or a combination of hardware and computer program products. Thus, the processing element 505 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 505 may be configured for a particular use or configured to execute instructions stored in volatile or non-volatile media or otherwise accessible to the processing element 505. As such, whether configured by hardware or computer program products, or by a combination thereof, the processing element 505 may be capable of performing steps or operations according to embodiments of the present invention when configured accordingly.

In one embodiment, the segment ledger system 104 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 510, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the local ledger management computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 515, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 505. Thus, the databases, database instances, database management systems, data, applications, programs, program modules, scripts, source code, object code, byte code, compiled code, interpreted code, machine code, executable instructions, and/or the like may be used to control certain aspects of the operation of the segment ledger system 104 with the assistance of the processing element 505 and operating system.

As indicated, in one embodiment, the segment ledger system 104 may also include one or more communications interfaces 520 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the segment ledger system 104 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the segment ledger system 104 may include, or be in communication with, one or more input elements, such as a keyboard input, a mouse input, a touch screen/display input, motion input, movement input, audio input, pointing device input, joystick input, keypad input, and/or the like. The segment ledger system 104 may also include, or be in communication with, one or more output elements (not shown), such as audio output, video output, screen/display output, motion output, movement output, and/or the like.

Exemplary Global Ledger Monitoring System

Figure 6:
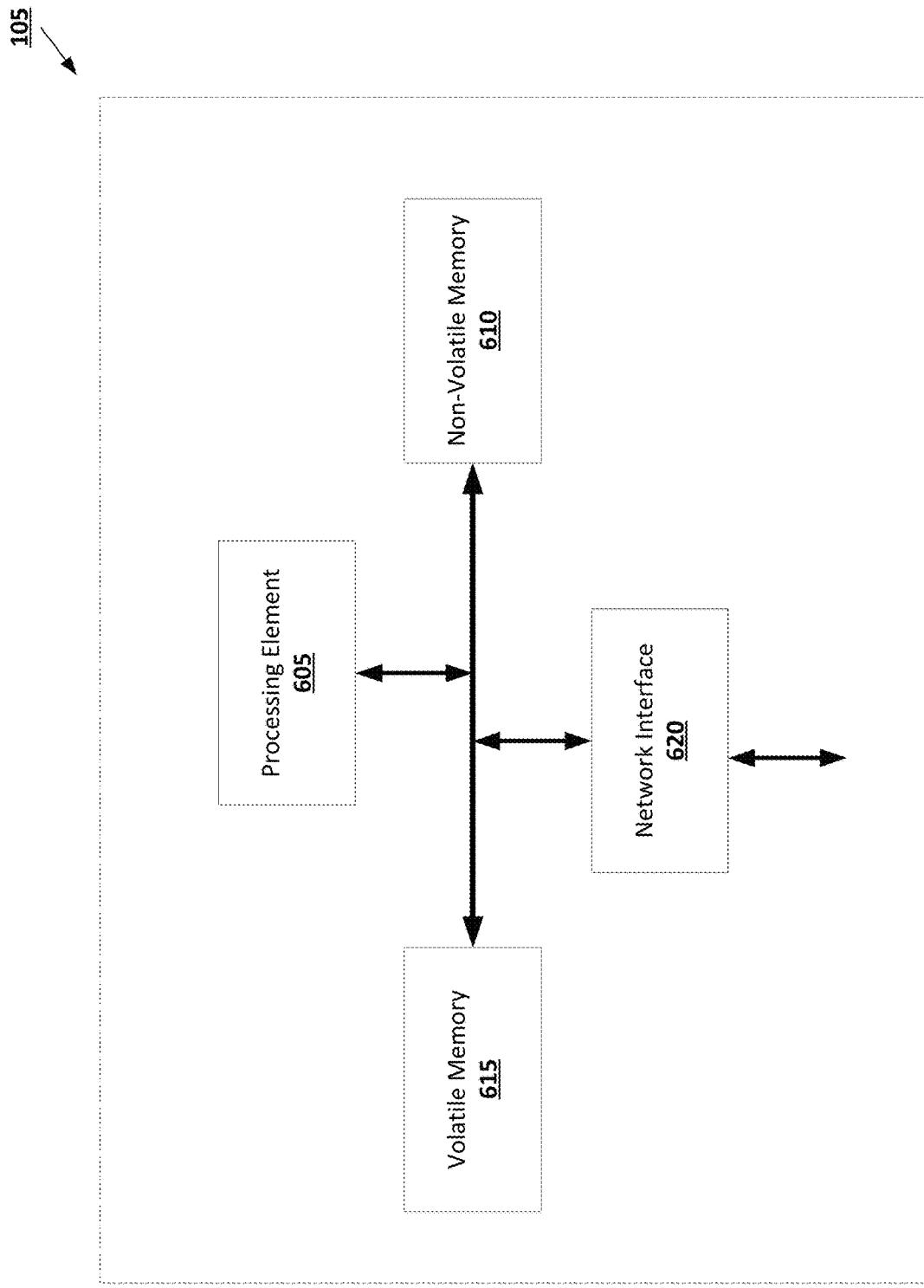
FIG. 6 provides an example global ledger monitoring system in accordance with some embodiments discussed herein.

FIG. 6 provides a schematic of a global ledger monitoring system 105 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the global ledger monitoring system 105 may also include one or more communications interfaces 620 for communicating with various computing entities, such as by communicating data, content, information, and/or similar terms used herein interchangeably that can be transmitted, received, operated on, processed, displayed, stored, and/or the like.

As shown in FIG. 6, in one embodiment, the global ledger monitoring system 105 may include, or be in communication with, one or more processing elements 605 (also referred to as processors, processing circuitry, and/or similar terms used herein interchangeably) that communicate with other elements within the global ledger monitoring system 105 via a bus, for example. As will be understood, the processing element 605 may be embodied in a number of different ways.

For example, the processing element 605 may be embodied as one or more complex programmable logic devices (CPLDs), microprocessors, multi-core processors, coprocessing entities, application-specific instruction-set processors (ASIPs), microcontrollers, and/or controllers. Further, the processing element 605 may be embodied as one or more other processing devices or circuitry. The term circuitry may refer to an entirely hardware embodiment or a combination of hardware and computer program products. Thus, the processing element 605 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 605 may be configured for a particular use or configured to execute instructions stored in volatile or non-volatile media or otherwise accessible to the processing element 605. As such, whether configured by hardware or computer program products, or by a combination thereof, the processing element 605 may be capable of performing steps or operations according to embodiments of the present invention when configured accordingly.

In one embodiment, the global ledger monitoring system 105 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 610, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the global ledger monitoring system 105 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 615, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 605. Thus, the databases, database instances, database management systems, data, applications, programs, program modules, scripts, source code, object code, byte code, compiled code, interpreted code, machine code, executable instructions, and/or the like may be used to control certain aspects of the operation of the global ledger monitoring system 105 with the assistance of the processing element 605 and operating system.

As indicated, in one embodiment, the global ledger monitoring system 105 may also include one or more communications interfaces 620 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the global ledger monitoring system 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the global ledger monitoring system 105 may include, or be in communication with, one or more input elements, such as a keyboard input, a mouse input, a touch screen/display input, motion input, movement input, audio input, pointing device input, joystick input, keypad input, and/or the like. The global ledger monitoring system 105 may also include, or be in communication with, one or more output elements (not shown), such as audio output, video output, screen/display output, motion output, movement output, and/or the like.

V. EXAMPLE SYSTEM OPERATION

As described below, Various embodiments of the present invention introduce techniques for efficient and resilient network-wide supervision of a hierarchically-segmented blockchain network. A hierarchically-segmented blockchain network may include S segment ledger systems 104 associated with S network segments and G local ledger systems. In some embodiments, persistent network-wide supervision of such a complex network would either require a single global ledger monitoring system that would persistently communicate with S+G monitored systems, or up to S+G monitoring systems each performing network-wide supervision for a subset of the S+G monitored systems, where the monitoring systems need to be in persistent communications to exchange configuration data. As clear, both solutions involve considerable network overhead which, in addition to using an excessive amount of network resources, increases the probability of network failure given a constant per-packet network failure probability. In contrast, various embodiments of the present invention utilize a centralized global ledger monitoring system that non-persistently monitors the S+G monitored systems via periodic chaincodes that are configured to verify targeted transactions associated with particular local ledgers and/or segment-wise ledgers during particular transactional junctures associated with ledger data. In this way, by enabling targeted monitoring of a hierarchically-segmented blockchain network using a centralized global ledger monitoring system that non-persistently monitors the monitored systems via periodic chaincodes that are configured to verify targeted transactions in particular transactional junctures, various embodiments of the present invention introduce techniques for efficient and resilient network-wide supervision of a hierarchically-segmented blockchain network.

Embodiments of the present invention utilize a blockchain network that comprises a plurality of nodes configured to host one or more ledgers, and/or one or more smart contract transactional protocol data objects, where each node of the plurality of nodes may be associated with one or more computing systems. A smart contract transactional protocol data object (e.g., smart contract) may refer to proposed contracts that can be partially or fully executed or enforced without human interaction. Smart contract transactional protocol data object may enable contracts between parties (e.g., sales of medical assets between a medical supplier and medical service provider) to be executed by the blockchain network without a third party to act as an intermediary between the parties (e.g., medical supplier and medical service provider). A node (e.g. via associated computing system) may be configured to execute chaincodes, access ledgers (e.g., ledger data), endorse transactions, and/or interface with one or more applications.

A chaincode may refer to an executable program that enables components of the blockchain network to interact with ledgers associated with the blockchain network to enable transactions such as updating a ledger, enquiring data from a ledger, receiving data from a ledger, and/or the like. A chaincode may describe a software that encompasses the business logic and policies for the blockchain network. In various embodiments, each chaincode may be associated with (or otherwise specify) an endorsement policy which defines the condition(s) for a valid transaction endorsement. In various embodiments, one or more nodes of the plurality of nodes of a blockchain network may serve (e.g., operate) as an endorsing node (also referred to herein as auditor node) configured to perform operations corresponding to endorsing transactions by the various nodes of the blockchain network, and in accordance with a corresponding endorsement policy.

In various embodiments, the blockchain network may comprise a plurality of subnetworks (also referred to herein as channels), where each subnetwork/channel may comprise one or more nodes (e.g., a defined set of nodes) of the plurality of nodes of the blockchain network. In various embodiments, at least one node of the plurality of nodes of the blockchain network may be configured to interact with one or more other nodes of the plurality of nodes of the blockchain network.

A hierarchically-segmented blockchain network according to embodiments of the present invention describe a network (e.g., blockchain network as described above) comprising a set of local ledger server systems 101, one or more global ledger monitoring systems 105, and a set of segment ledger systems 104 each associated with a network segment of S network segments (e.g., where S may be 2, 4, 7, or the like). In some embodiments, the S network segments are associated with L network levels (e.g., where L may be 2, 4, 7, or the like), such that each local ledger server system 101 is associated with L network segments each being associated with a network level of the L network levels. In some embodiments, given a non-zero positive integer i, each network segment that is associated with an ith network level is hierarchically dependent on a "parent" network segment that is associated with an (i−1)th network level, with the zeroth network level being the highest network level. For example, given L=2, the zeroth network level may be a state network level and the first network level may be a county network level. Accordingly, in the noted exemplary embodiment, each county-related network segment is associated with a first network level and is a "child" network segment of a state-related network segment that is associated with a zeroth network level. Moreover, in the noted exemplary embodiment, each local ledger server system 101 (e.g., which may be a local ledger server system 101 that is associated with a medical service provider) is associated with a county-related network segment and a state-related network segment. Thus, given L=2, the local ledger server system 101 is associated with two network segments each being associated with one of the two defined network levels, where the two defined network levels have a hierarchical relationship as discussed above.

In various embodiments, the hierarchically-segmented blockchain network is an enterprise-based blockchain network that is characterized by a modular framework that allows separation of the plurality of the subnetworks/channels of the hierarchically-segmented blockchain network, and utilizes at least in part a private permission network that allows role-specific access with respect to the various components (e.g., channels, nodes and/or external computing entities) associated with or otherwise interacting/communicating with components of the hierarchically-segmented blockchain network. In some embodiments, each of the local ledger server systems 101 correspond to a dedicated private channel in the hierarchically-segmented blockchain network comprising a set of nodes that includes an internal service provider node 119, a relative service output cost node 120, a relative resource output cost node 122, and a service endpoint document node 121, such that a given local ledger server system 101 may not possess the requisite permission to interact with (e.g. access) ledgers of other local ledger server systems 101, whereas global ledger monitoring systems 105 may possess the requisite permission to interact with (e.g., access) ledgers of each of the local ledger server systems 101. In some embodiments, each segment ledger system 104 corresponds to a public channel in the hierarchically-segmented blockchain network, such that each local ledger server system 101 and each global ledger system may interact (e.g., access) with the segment ledgers of the segment ledger systems 104. Moreover, in various embodiments, external service recipient computing entities may access or otherwise interact with the segment ledgers of the segment ledger systems 104.

In some embodiments, the various nodes of the hierarchically-segmented blockchain network are associated with defined privileges/permissions. In some embodiments (such as medical service provider-related blockchain network scenario), each internal service provider node is permissioned to execute chaincodes, access ledger data, endorse transactions, and interface with applications (e.g., invoicing applications); each supplier node (e.g., associated with an external resource provider computing entity 103) is permissioned to execute chaincodes and access (e.g., interact with) ledger data but not permissioned to endorse transactions or interface with invoicing applications; each auditor node (e.g., associated with a global ledger monitoring system 105) is permissioned to execute chaincodes, access ledger data, and endorse transactions, but not permissioned to interface with invoicing applications.

Figure 7:
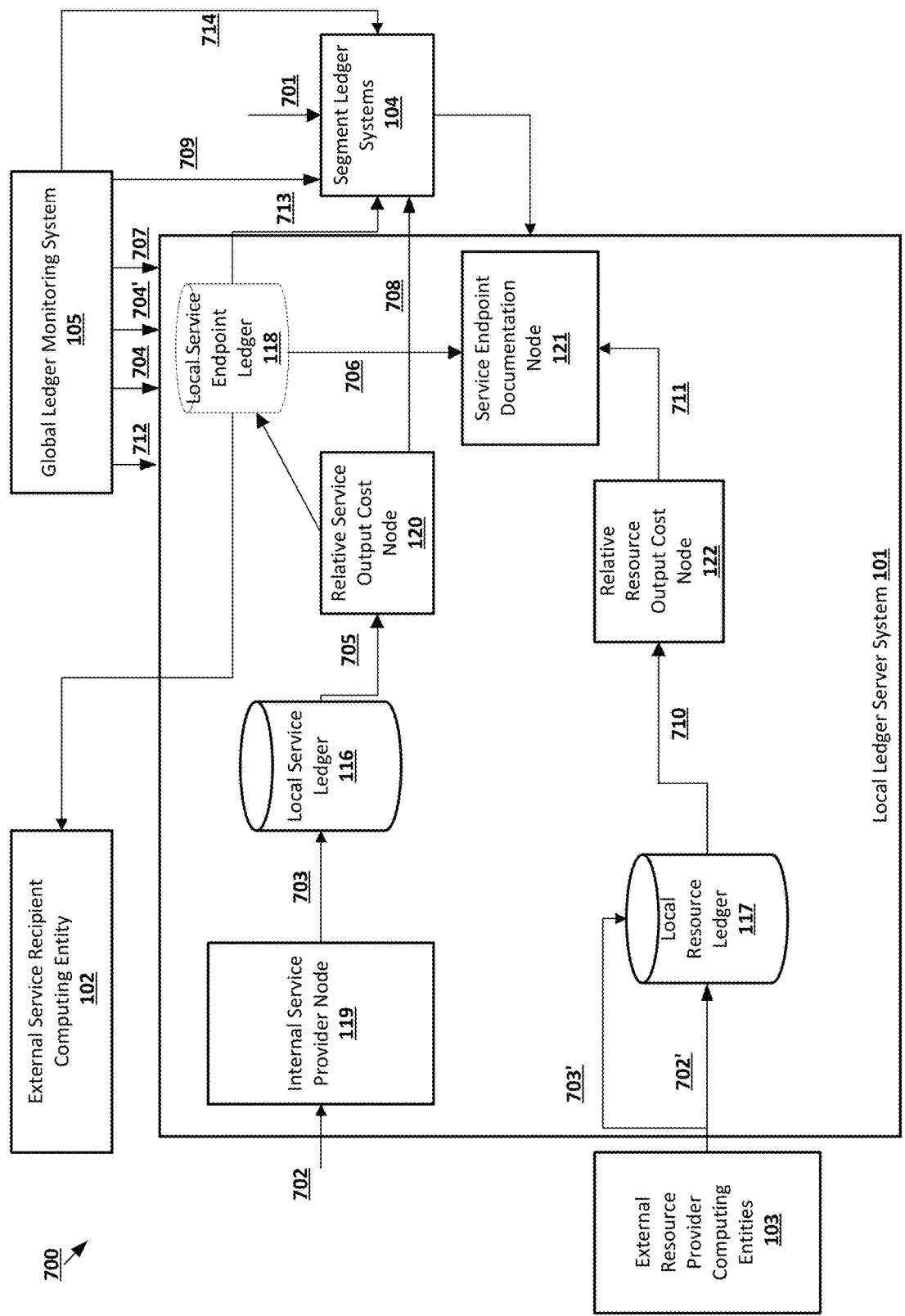
FIG. 7 provides a block diagram of an example process for enabling low-bottleneck network-wide supervision of a local ledger server system in a hierarchically-segmented blockchain network in accordance with some embodiments discussed herein.

FIG. 7 provides a block diagram of an example process 700 for enabling low-bottleneck network-wide supervision of a local ledger server system 101 in a hierarchically-segmented blockchain network. Via the various steps/operations of the process 700, the local ledger management computing entity 106, can perform various transactional management operations to cause generation and/or updating of one or more output measures with respect to the local ledger system (e.g., entity associated with the local ledger server system 101) in a service endpoint document data object and/or in one or more ledgers (e.g., local service endpoint ledger and segment ledgers). In various embodiments, examples of such output measures include relative service output cost measures, service output cost measures, resource output cost measures, field-wise output cost ratio, relative resource output cost measures, and/or segment-wide service output cost distribution measures.

The process 700 begins when the local ledger management computing entity 106 identifies (at step/operation 701) a plurality of segment ledger systems 104 associated with the plurality of network segments for the local ledger server system 101. For example, consider where the local ledger server system 101 is associated with two network segments (e.g., a county-related network segment and state-related network segment). In the noted example embodiment, the local ledger management computing entity 106 may be configured to identify a segment ledger system 104 associated with the county-related network segment and a segment ledger system 104 associated with the state-related network segment, where each of the county-related network segment and state-related network segment is associated with a respective network level of a plurality of network levels having a hierarchical relationship (as discussed above).

The local ledger server system 101 may store and/or maintain a set of local ledgers 111 that enables the local ledger management computing entity 106 to perform transactional management operations in the hierarchically-segmented blockchain network by interacting with one or more external systems (e.g., external service recipient computing entities 102, external resource provider computing entities 103, and/or a set of segment ledger systems 104) and under external supervision of one or more global ledger monitoring systems 105 (e.g., a centralized global ledger monitoring system 105). In some embodiments, the set of local ledgers enable the local ledger management computing entity 106 to communicate with the one or more global ledger monitoring systems 105 to enable the one or more global ledger monitoring systems 105 to execute validation chaincodes that enable external supervision of the hierarchically-segmented blockchain network by the one or more global ledger monitoring systems 105. In some embodiments, the global ledger monitoring systems 105 may be associated with a governmental body/agency (e.g., a centralized global ledger monitoring system 105).

In some embodiments, the set of local ledgers 111 stored and/or maintained by the local ledger server system 101 includes a local service ledger 116, a local service endpoint ledger 118, and a local resource ledger 117. In some embodiments, each local ledger stored and/or maintained by the local ledger server system 101 stores data associated with the latest state of a service entry and/or a resource entry that is being processed via a transactional pipeline characterized by a sequence of transactional pipeline junctions at a corresponding transactional pipeline junction. For example, the local service ledger 116 may store service ledger entries that describes service entries before any processing by the transactional pipeline. As another example, the local service endpoint ledger 118 may store service endpoint ledger entries that describes service endpoint documentation data objects that correspond to data obtained by processing the service entries via the transactional pipeline before presenting the data to the relevant external service recipient systems. As a further example, the local resource ledger 117 may store resource ledger entries that describe smart contract transactional protocol data units for resource types as provided by external resource provider systems.

As depicted in FIG. 7, the process 700 continues when the local ledger management computing entity 106 identifies (at step/operation 702) a service entry that is associated with one or more service fields, where a service entry may refer to a data entity that describes one or more services associated with a local ledger server system 101, such as one or more services performed using the operational resources provided by the local ledger server system 101 or otherwise associated with the local ledger server system 101. For example, in some embodiments, the service entry may describe one or more services (e.g., medical services) performed by a medical service provider/healthcare provider associated with the local ledger server system 101 for a patient during a healthcare encounter. In the noted example, identifying a service entry may comprise identifying a service (e.g., medical service) provided by a particular medical service provider (e.g., at an internal service provider node 119) to an external service recipient entity (e.g., a patient) during the healthcare encounter. Moreover, in the noted example, each medical service performed by the medical service provider may be described by a "service field," while each medical asset used by the medical service provider to perform one or more medical services with respect to the particular patient may be described by a "resource field." Accordingly, service fields and resource fields may be data fields described by a service entry that describe service types and/or resource types used by the local ledger server system 101 while performing particular defined services. Moreover, each service field may be associated with a service type, while each resource field may be associated with a resource type. Examples of service types include a flu vaccine injection service type, an emergency room (ER) visit service type, and/or a medical resonance imaging (MM) service type. Examples of resource types include a blood filter resource type and/or an immobilizer resource type.

A service entry may be associated with one or more service fields. For example, a particular service entry may include an ER visit by a patient and a flu vaccine injection administered to the patient. As another example, a particular service entry may include an ER visit by a patient, an MM administered to the patient, and a flu vaccine injection administered to the patient. Similarly, a service entry may be associated with one or more resource fields. For example, a particular service entry may include utilization of one or more blood filters. As another example, a particular service entry may include utilization of one or more blood filters, as well as one or more immobilizers.

In some embodiments, a service field is associated with an output cost measure that describes the cost of the service field as provided to one or more external service recipient entities (e.g., one or more patients, one or more patient payers, one or more patient devices, and/or one or more payer devices). An example of an output cost measure for a service field is the price of a medical service corresponding to the service field. In some embodiments, a resource field is associated with both an input cost measure that describes the cost of the resource field as provided by one or more external resource provider entities (e.g., one or more asset suppliers and/or one or more asset supplier devices), as well as an output cost measure that describes the cost of the resource field as provided to one or more external service recipient entities (e.g., one or more patients, one or more patient payers, one or more patient devices, and/or one or more payer devices). An example of an input cost for a resource field is the cost of purchasing a medical asset corresponding to the resource field. An example of an output cost for a resource field is the price for the medical asset corresponding to the resource field as charged to the patient and/or to the patient's payer.

In some embodiments, each service field associated with a service entry may be associated with other data that may or may not be utilized by the local ledger server system 101 while performing particular defined services. For example, the service field may be associated with an external service recipient entity that describes the party (e.g., patient, individual, or the like) with respect to whom the service field was provided, a service ID that describes an identification (e.g., unique identification) of the service field, a service code that describes a medical code for the service field, a service state that describes the state (e.g., Virginia, Georgia, Texas, or the like) where the service field was rendered, a service county that describes the county (e.g., Fairfax county, Richmond county, Clay county, or the like) where the service field was rendered, and/or the like.

The process 700 continues when the local ledger management computing entity 106 (e.g., at the internal service provider node 119) generates at (at step/operation 703) a service ledger entry for the service entry in a local service ledger 116 of the local ledger server system 101, where a local service ledger 116 may refer to data entity that describes a ledger that describes a set of service ledger entries each corresponding to a corresponding service entry. As discussed above, in example embodiments, a service entry may be associated with one or more service fields, where each service field may be associated with one or more data items (e.g., service type, service output cost measure, and/or other data items) associated with the service entry. In some embodiments, generating a service ledger entry for a service entry in a local service ledger 116 comprise adding records for each service field associated with the service entry, where each record may comprise a plurality of data fields each corresponding to a data item of the one or more data items associated with the service field for the respective record. In the noted example embodiment, to add a record for a particular service field, the local ledger management computing entity ledger may be configured to populate the respective data fields for the data items (e.g., service type, service output cost measure, and/or the like) associated with the service field with the respective values.

For example, consider where a patient visits an ER associated with a medical service provider and the medical service provider provides a flu vaccination to the patient. In the noted example, the local ledger management computing entity 106 may generate a service ledger entry with respect to the ER visit and flu vaccination by adding records to the local service ledger 116 that describes the ER visit by the patient and the cost to the patient (and/or payer, insurance company, and/or the like), as well as records that describe the flu vaccination provided to the patient and the cost to the patient (and/or payer, insurance company, and/or the like) of the flu vaccination provided to the patient, where the records are associated with a corresponding service entry.

The process 700 continues when in response to generating the service ledger entry for the service entry in the local service ledger 116 of the local ledger server system 101, one or more global ledger monitoring systems 105 (e.g., auditor node(s)) in the hierarchically-segmented blockchain network executes 704 a service entry validation chaincode to endorse the service entry in the local ledger service entry (e.g., in accordance with an endorsement policy). In various embodiments, the validation chaincode is configured to assure the following transactions/operations are performed: (i) that the service entry is added to the correct local service ledger 116, and (ii) that data (e.g., service type, service output cost measure, and the like) associated with the service entry are added correctly to the local service ledger 116.

Figure 8:
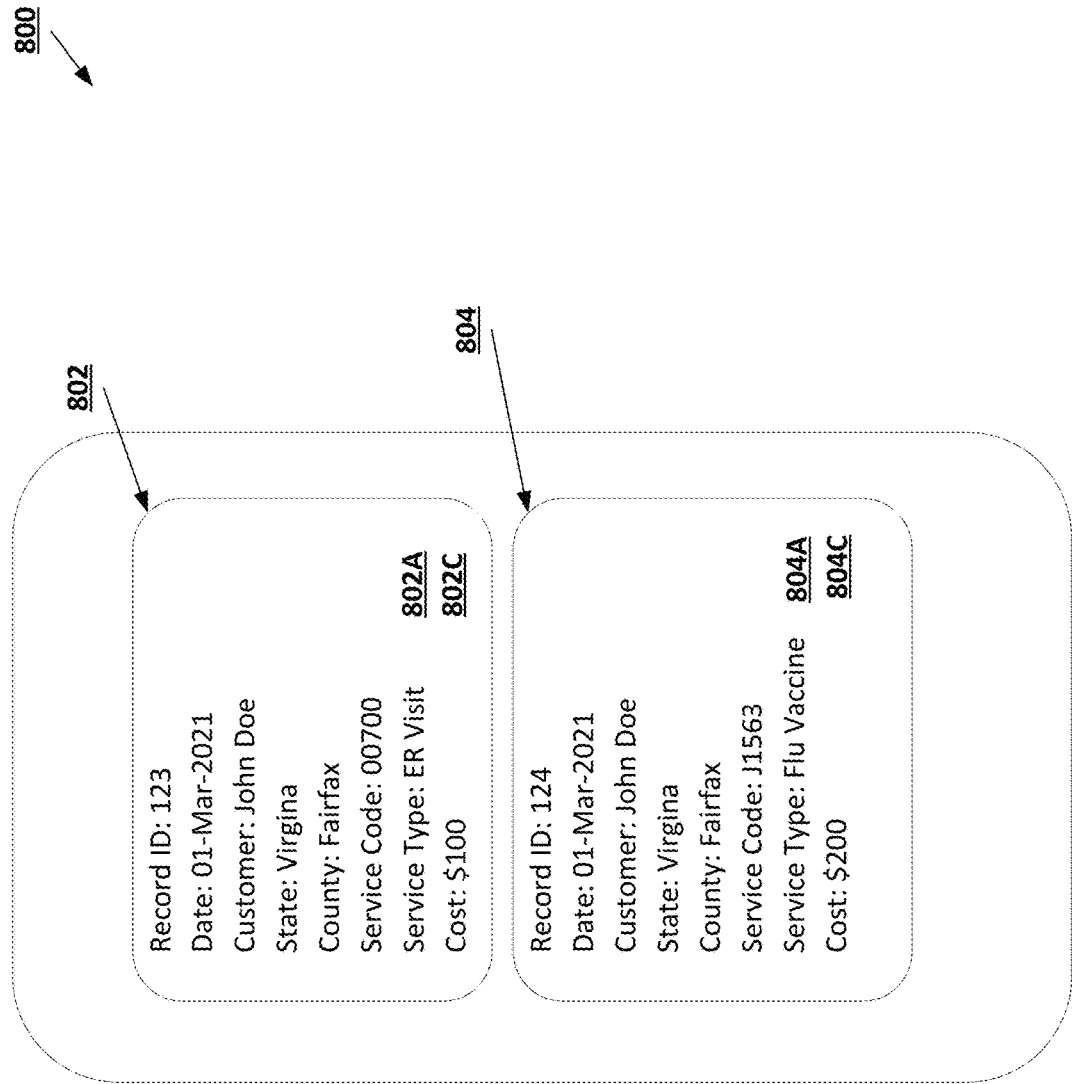
FIG. 8 provides an operational example of a service entry in a local service ledger in accordance with some embodiments discussed herein.

FIG. 8 depicts an operational example 800 of a service entry in a local service ledger 116. In the operation example 800, the service entry is associated with two service fields. As shown in FIG. 8, the depicted service entry in the local service ledger 116 includes record 802 and record 804 generated by the local ledger management computing entity 106 describing the first service field and second service field for the service entry respectively. As shown in FIG. 8, each record includes the respective service types 802A, 804A for the respective service fields and the respective service output cost measures 802C, 804C for the respective service fields, as well as other associated data (e.g., external service recipient entity (e.g., patient) associated with the service entry, the county, state, and the like).

Returning to FIG. 7, the process 700 continues when the local ledger management computing entity 106 (e.g., at the relative service output cost node 120) generates (at step/operation 705) a plurality of relative service output cost measures with respect to the plurality of network levels associated with the local ledger server system 101. For example, in some embodiments, given L network levels of the hierarchically-segmented blockchain network associated with the local ledger server system 101, once a service ledger entry for a service entry is created, L relative service output cost measures are then generated for the service entry, where each relative service output cost measure corresponds to a respective network level (e.g., network segment). Accordingly, in various embodiments, the local ledger management computing entity 106 generates, for each network level of the plurality of network levels associated with the local ledger server system 101, a relative service output cost measure. In some embodiments, a relative output cost measure may describe the ratio of the cost of services provided by an entity (e.g., medical service provider) associated with a given local ledger server system 101 to the average cost of services across the population of entities (e.g. medical service providers) associated with local ledger server systems 101 associated with a given network level. In various embodiments, a relative service output cost measure is associated with a service entry.

In some embodiments, the local ledger management computing entity 106 generates the plurality of relative service output cost measures with respect to the plurality of network levels based at least in part on one or more service output cost distribution measures for the respective plurality of network levels, where each output cost distribution measure is associated with a particular service field of a plurality of service fields. In various embodiments, generating the plurality of relative service output cost measures comprise enquiring the relative service output cost node 120 to calculate the relative service output cost measure, which in turn enquires each associated network segment (e.g., network level) for data (including the output cost distribution measure for each service) to calculate the relative service output cost measure per network segment. An output cost distribution measure for a particular service field may describe a measure of a statistical distribution (e.g., an average or other centroid measure) of service output cost measures of a service field of a corresponding service type in a respective network segment (e.g. respective network level) across the plurality of local ledger server systems 101 of the hierarchically-segmented blockchain network associated with the network segment/network level. For example, an output cost distribution measure for a particular service field may describe the average service output cost measure for the particular service field based at least in part on each historical output cost measure for the service field for each local ledger server system 101 associated with the corresponding network level (e.g., network segment).

Figure 9:
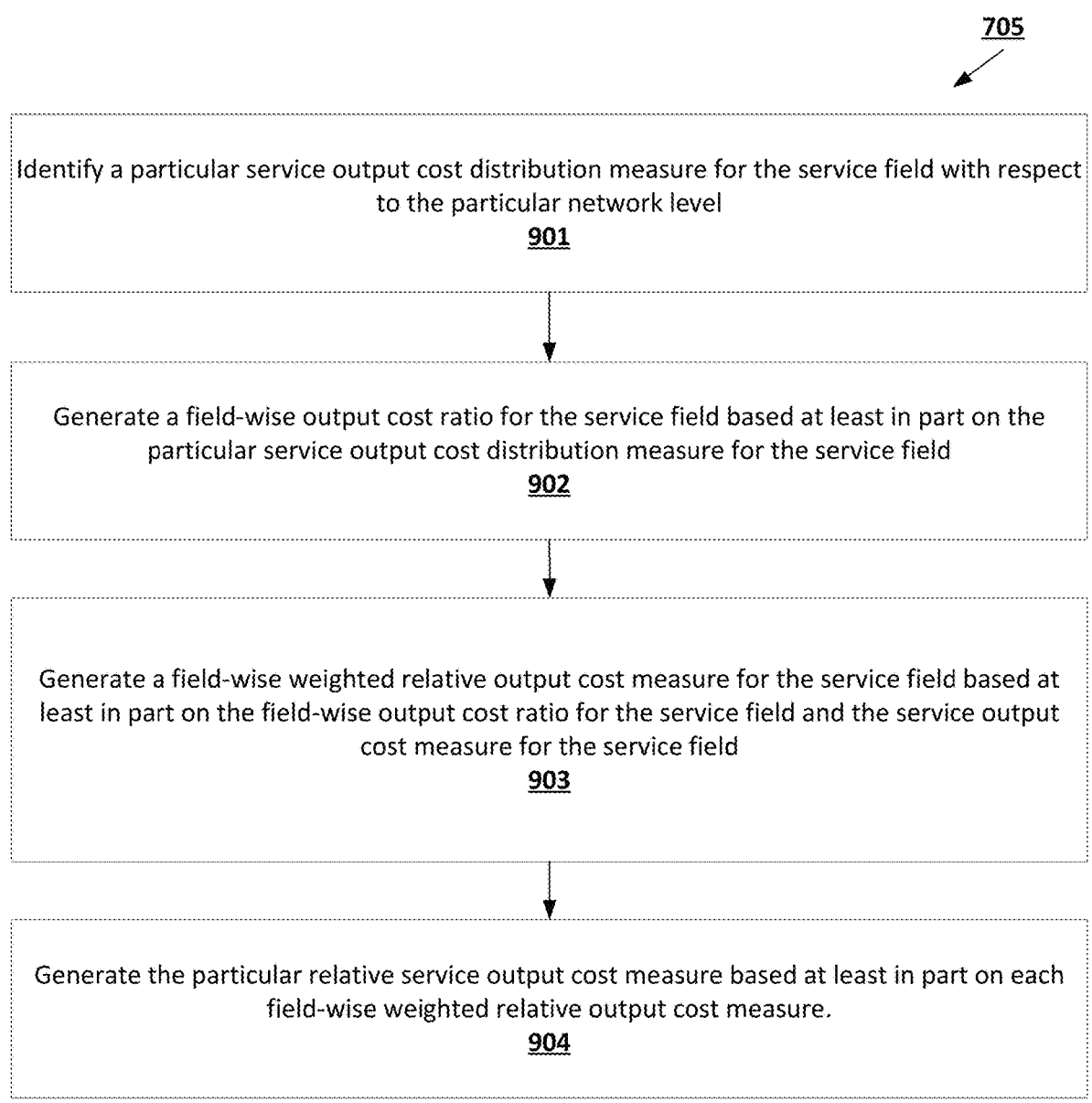
FIG. 9 provides a flowchart diagram of an example process for generating a relative service output cost measure in accordance with some embodiments discussed herein.

In some embodiments, the step/operation 705 may be performed in accordance with the process that is depicted in FIG. 9, which is an example process for generating a particular relative service output cost measure with respect to a particular network level (e.g., state network level, county network level, or other network levels). Accordingly, in some embodiments, the process that is depicted in FIG. 9 may be performed for each network level. The process depicted in FIG. 9 begins at step/operation 901 when for each service field, the local ledger management computing entity 106 identifies a particular service output cost distribution measure for the service field with respect to the particular network level. In some embodiments, identifying a particular service output cost distribution measure for the service field with respect to the particular network level may comprise receiving the particular service output cost distribution measure for the service field from the segment ledger system 104 associated with the particular network level.

In various embodiments, each network level of the plurality of network levels is associated with a segment ledger system 104 that stores and/or maintains one or more segment ledgers that enables the local ledger management computing entity 106 to perform transactions, such as generating relative service output cost measures. In various embodiments, each segment ledger stored and/or maintained by a segment ledger system 104 stores data associated with the latest state of a service output cost distribution measure for each respective service field of a plurality of service fields. In various embodiments, the plurality of service output cost distribution measures may be received from the plurality of segment ledger systems 104 (e.g., segment ledger) associated with the plurality of network levels. For example, consider where the local ledger server system 101 is associated with two network levels with a hierarchical relationship (e.g., state network level and county network level) and where a service entry is associated with two service fields (e.g., ER visit and flu vaccination). In the noted example, for the ER visit, the local ledger management computing entity 106 may be configured to receive a first service output cost distribution measure for the ER visit from the segment ledger system 104 associated with the state network level and a second service output cost distribution measure for the ER visit from the county network level. Additionally, for the flu vaccination, the local ledger management computing entity 106 may be configured to receive a first service output cost distribution measure for the flu vaccination from the segment ledger system 104 associated with the state network level and a second service output cost distribution measure for the flu vaccination from the county network level. In some embodiments, the local ledger management computing entity 106 may be configured to query the segment ledger system 104 associated with the particular network level for the output cost distribution measure in response to generating a service ledger entry for the service entry associated with the service field.

At step/operation 902, for each service field associated with the service entry, the local ledger management computing entity 106 generates a field-wise output cost ratio for the service field based at least in part on the particular service output cost distribution measure for the service field with respect to the network level and the service output cost measure for the service field. In various embodiments, a field wise-output cost ratio is associated with a given service entry (e.g., associated with a given healthcare encounter). A field-wise output cost ratio for a service field may describe the ratio of the cost of the service field (e.g., service type) provided to the patient by the medical service provider to the average cost of the given service field across the population of medical service providers associated with the network segment/network level (e.g., state network segment, county network segment, and/or the like). In some embodiments, generating the field-wise output cost ratio comprise performing operations corresponding to the equation:

$$R\_Cost = \frac{S\_Cost}{D\_Cost} \qquad \text{Equation 1}$$

In Equation 1, R_Cost is the field-wise output cost ratio for the service field with respect to the network level, S_Cost is the service output cost measure for the service field (e.g., as provided by the medical provider to the patient), and D_Cost is the service output cost distribution measure for the service field with respect to the network level.

At step/operation 903, for each service field associated with the service entry, the local ledger management computing entity 106 generates a field-wise weighted relative output cost measure for the service field with respect to the network level based at least in part on the field-wise output cost ratio for the service field and the service output cost measure for the service field. In some embodiments, generating the field-wise weighted relative output cost measure comprise performing operations corresponding to the equation:

$$W\_Cost = R\_Cost * S\_Cost \qquad \text{Equation 2}$$

In Equation 2, W_Cost is the field-wise weighted relative output cost measure for the service field with respect to the network level, R_Cost is the field-wise output cost ratio for the service field with respect to the network level, and S_Cost is the service output cost measure for the service field with respect to the network level.

At step/operation 904, the local ledger management computing entity 106 generates the particular relative service output cost measure with respect to the network level based at least in part on each field-wise weighted relative output cost measure and each service output cost measure. In some embodiments, generating the field-wise weighted relative output cost measure for a given network level comprise performing operations corresponding to the equation:

$$\text{Rel\_Cost} = \frac{\sum_{i=1}^{n} W\_Cost_i}{\sum_{i=1}^{n} S\_Cost_i} \qquad \text{Equation 3}$$

In Equation 3, Rel_Cost is the relative service output cost measure with respect to the network level, W_Cost is the field-wise weighted relative output cost measure with respect to the network level, S_Cost is the service output cost measure for the service field, and n is the number of service fields.

Returning to FIG. 7, the process 700 continues when the local ledger management computing entity 106 (e.g., at the service endpoint documentation node 121) generates (at step/operation 706) a service endpoint document data object that describes the plurality of relative service output cost measures. As noted above, in some embodiments, given L network levels of a hierarchically-segmented blockchain network, once a service ledger entry for a service entry is created, L relative service output cost measures are generated for the service entry. Additionally, in some embodiments, subsequent to generating the L relative service output cost measures, the L relative service output cost measures are added to a service endpoint document data object, where the service endpoint document data object may describe data (e.g., invoice data) associated with a service entry for presentation to an external service recipient system including the L relative service output cost measures for the corresponding service entry. For example, in some embodiments, the service endpoint document data object may be an invoice of services provided by a medical service provider to a patient, where the invoice may be generated by the medical service provider (or representative of a medical service provider) for presentation to the patient (and/or the payer, insurance company, and/or the like associated with the patient).

The process 700 continues when, in response to generating the service endpoint document data object (e.g., once the service endpoint document data object for a service entry is generated), one or more global ledger monitoring system 105 in the hierarchically-segmented blockchain network executes (at step/operation 707) an output cost distribution validation chaincode to endorse the service endpoint document data object and cause generation of a service endpoint ledger entry for the service endpoint document data object in a local service endpoint ledger 118 of the local ledger server system 101. In some embodiments, the output cost distribution validation chaincode is configured to assure that the following transactions/operations are performed: (i) service output cost distribution measure enquiry from the respective segment ledger system 104 associated with the local ledger server system 101, and (ii) calculation of the relative service output cost measures with respect to each network level (e.g. county-related network level, state-related network level, and/or the like) associated with local ledger server system 101 based at least in part on the service output cost distribution measures and service output cost measures as described in equations 1-3 above.

As further depicted in FIG. 7, the process 700 continues when the local ledger management computing entity 106 (e.g., at the relative service output cost node 120) provides (at step/operation 708) the one or more service output cost measures, the field-wise output cost ratios, the field-wise weighted relative output cost measures, and/or the one or more relative service output cost measures to the plurality of segment ledger systems 104. The process 700 continues when, in response to receipt of the one or more service output cost measures, the field-wise output cost ratios, the field-wise weighted relative output cost measures, and/or the one or more relative service output cost measures by a respective segment ledger system 104, one or more global ledger monitoring system 105 executes (at step/operation 709) a respective level-specific service cost validation chaincode (e.g., in accordance with an endorsement policy) to cause updating of segment-wide service output cost distribution measures for each service type that is associated with the service entry with respect to the network segment that is associated with the respective segment ledger system 104. For example, given L network levels associated with the local ledger server system 101, one or more global ledger monitoring systems 105 executes a respective level-specific service cost validation chaincode for each segment ledger system 104 associated with a network level of the L network levels.

A segment-wide service output cost distribution measure for a particular service field associated with a corresponding service type for a respective network level may describe the latest state of the statistical distribution (e.g., average and or other centroid measure) of the service output cost distribution measure for a given service field with respect to the plurality of local ledger server systems (e.g., medical provider local ledger server systems) associated with the network level. In some embodiments, updating of segment-wide service output cost distribution measure comprise performing operations corresponding to the equation below for each network level:

$$N\_Cost = \frac{(D\_Count * D\_Cost) + S\_Cost}{D\_Count + 1} \quad \text{Equation 4}$$

In Equation 4, N_Cost is the updated segment wide service output cost distribution measure, D_Count is the current count (e.g., number) of service endpoint document data objects associated with the network level, D_Cost is the current segment wide service output cost distribution measure, and S_Cost is the received service output cost measure for the service field.

In some embodiments, the respective level-specific service cost validation chaincode is configured to assure that the following transactions/operations are performed: (i) adding the transactions (e.g., service output cost measures) to the respective segment ledger systems 104 (e.g., respective segment ledger) of each network level associated with the local ledger server system 101 and (ii) updating the respective segment ledger systems 104 (e.g., respective segment ledgers) for the network levels to reflect updated segment-wide service output cost measures based at least in part on performing operations corresponding to equation 4 (discussed above).

In various embodiments, each segment ledger may be configured to perform one or more segment management operations based at least in part on the segment-wide service output cost distribution measures that are maintained by the segment ledger system 104. In some embodiments, the one or more segment management operations may comprise generation and/or updating a user interface configured to display the segment-wide service output cost distribution measures, the plurality of relative service output cost measures, and/or other data.

Figure 10:
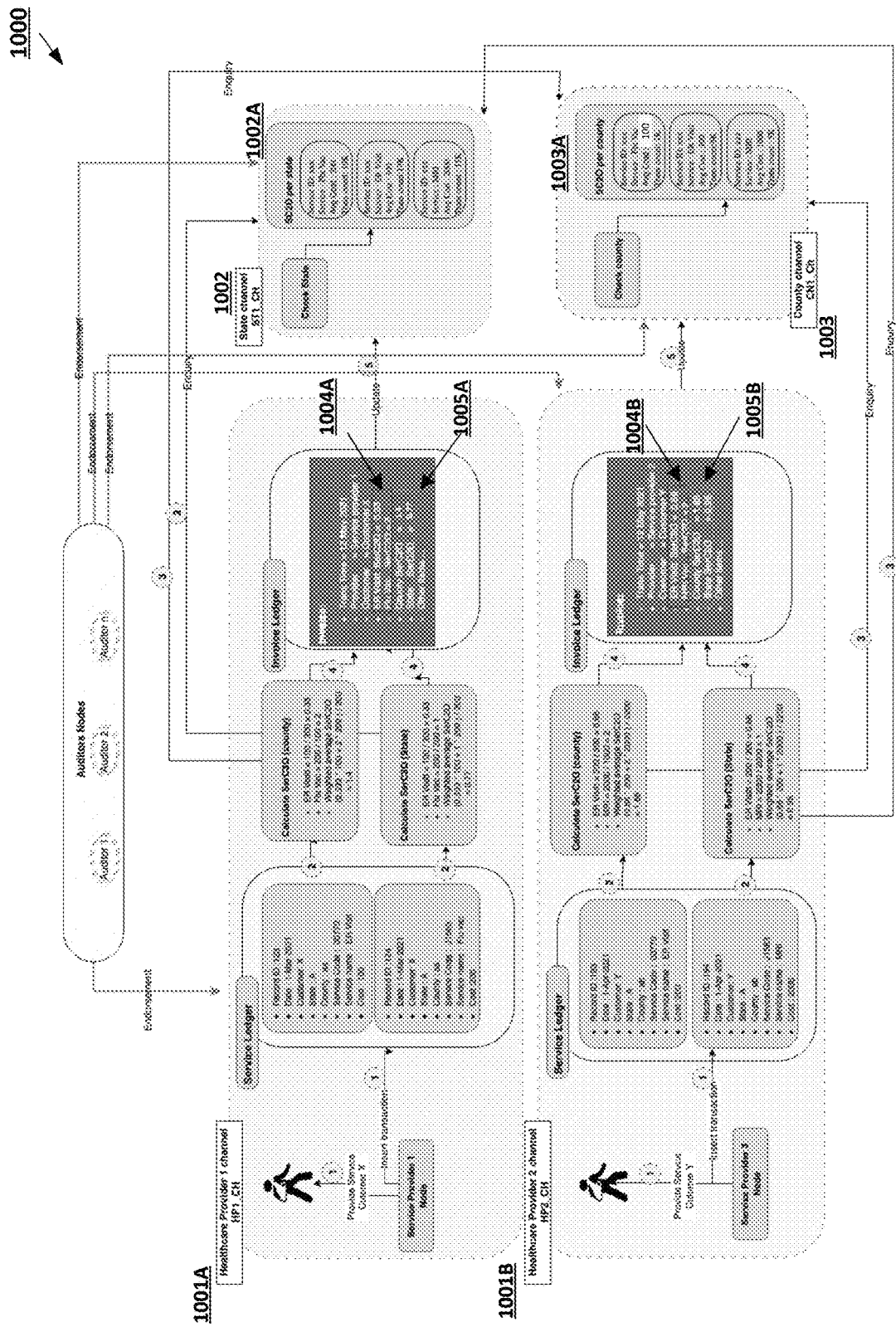
FIG. 10 provides an operational example for updating segment ledgers of a hierarchically-segmented blockchain network in accordance with some embodiments herein.

FIG. 10 provides an operational example 1000 for generating relative service output cost measures and updating segment ledgers of a hierarchically-segmented blockchain network in accordance with some embodiments herein. As shown in the operational example 1000 of FIG. 10, the hierarchically-segmented blockchain network comprise a plurality of dedicated medical service provider channels 1001A and 1001B each storing a service ledger (e.g., local service ledger 116) and configured to interact with two network segment channels (e.g., state channel 1002 and county channel 1003) each corresponding to a network level and storing a segment ledger (e.g., 1002A, 1003A). As depicted in the operational example of FIG. 10, each service provider channel, in response to providing a medical service to a patient, adds data relating to the medical service transaction (e.g. cost of the provided medical service to the patient) to the service ledger and communicates with each associated network segment channel to generate a service endpoint document data object (e.g. invoice) for the patient comprising a field-wise output cost ratio (e.g., 1004A and 1004B) for each service field (e.g., ER visit, Flu vaccination, and MRI) and relative service output cost measures (e.g., 1005A and 1005B) for each network level (e.g., state level and county level). Moreover, each service provider provides data to each network segment, that enables the network segments to calculate a segment-wide service output cost distribution measure that is stored in the respective segment ledger 1002A and segment ledger 1003A.

Returning to FIG. 7, the process 700 continues when the local ledger management computing entity 106 generates (at step/operation 710) a relative resource output cost measure for one or more resource fields associated with the service entry. In some embodiments, the local ledger management computing entity 106 may be configured to determine whether a service entry is associated with one or more resource fields. As discussed above, in some embodiments, each resource field is associated with a resource type of a plurality of defined resource types. Furthermore, as discussed above, each resource field may be associated with a resource input cost measure (e.g., cost of purchasing a medical asset), as well as a resource output cost measure (e.g., price for the medical asset corresponding to the resource field as charged to a patient and/or to the patient's payer). In some embodiments, the local ledger management computing entity 106 determines the relative cost measure for each resource field based at least in part on the resource input cost measure and the output cost measure associated with the respective resource field.

In various embodiments, the local ledger management computing entity 106 receives the resource input cost measure from a local resource ledger 117 associated with the resource type associated with the resource field. In various embodiments, the local ledger server system 101 comprises a plurality of local resource ledgers 117 each associated with a resource type of a plurality of resource types. For example, in the noted embodiments, each local resource ledger 117 of the plurality of local resource ledgers 117 comprise data for a particular resource type of a plurality of resource types. Examples of such data, includes the resource input cost measure for the resource type associated with the local resource ledger 117. In some embodiments, a local resource ledger 117 may be associated with a plurality of resource types (e.g., comprising data for a plurality of resource types).

Figure 11:
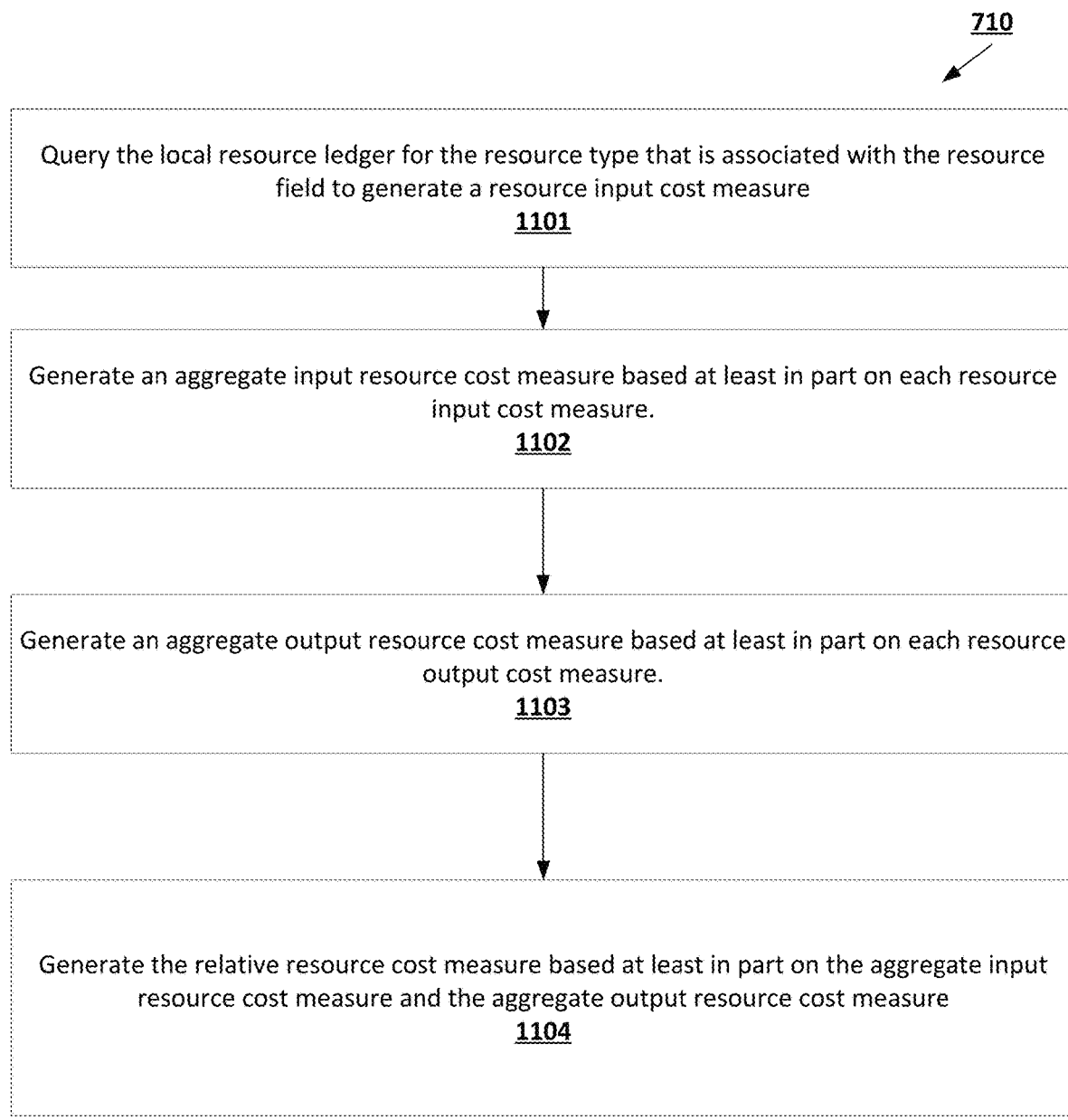
FIG. 11 provides a flowchart diagram of an example process for generating a relative resource output cost measure in accordance with some embodiments herein.

In some embodiments, the step/operation 710 may be performed in accordance with the process that is depicted in FIG. 11, which is an example process for generating a relative resource output cost measure for the one or more resource fields associated with a service entry. The process depicted in FIG. 11 begins at 1101 when the local ledger management computing entity 106 queries the local resource ledger 117 for the resource type that is associated with the resource field to generate a resource input cost measure for the resource field.

In various embodiments, the local ledger management computing entity 106 is configured to maintain the latest state of the data stored in the local resource ledgers 117. For example, in various embodiments, (e.g., prior to generating a resource input cost measure for a resource field), the local ledger management computing entity 106 updates each local resource ledger 117 to maintain the latest state of the data stored in the local resource ledger 117. As depicted in FIG. 7, the process of updating a local resource ledger 117 begins when the local ledger management computing entity 106 receives (at step/operation 702') a smart contract transactional protocol data object associated with the resource type that corresponds to the particular local resource ledger 117.

In some embodiments, a smart contract transactional protocol data object associated with a resource type may be received by the local ledger management computing entity 106 when a medical supplier sells a medical asset to a medical provider associated with the corresponding local ledger server system 101. Upon receiving the smart contract transactional protocol data object associated with the resource type that correspond to the particular local resource ledger 117, the local ledger management computing entity 106 generates (at step/operation 703') a local resource ledger entry in the particular local resource ledger 117 based at least in part on the smart contract transactional protocol data object. In response to generation of the local resource ledger entry, one or more of the global ledger monitoring systems 105 is configured to execute (at step/operation 704') a resource receipt validation chaincode (e.g., in accordance with an endorsement policy) to endorse the smart contract transactional protocol data unit. In some embodiments, the resource receipt validation chaincode is configured to assure the following transactions/operations are performed: (i) addition of the transaction to the corresponding local resource ledger 117 associated with the correct entity (e.g., medical service provider); (ii) addition of the local resource ledger entry to the correct local resource ledger 117, (iii) updating the count of the resource type (e.g., medical asset) in the local resource ledger 117, (iv) updating the average resource input cost measure for the resource type in the local resource ledger 117.

Returning to FIG. 11, at step/operation 1102, the local ledger management computing entity 106 generates an aggregate input resource cost measure based at least in part on each resource input cost measure. In some embodiments, generating the aggregate input resource cost measure may comprise adding the input resource cost measures for the one or more resource fields associated with the service entry.

At step/operation 1103, the local ledger management computing entity 106 generates an aggregate output resource cost measure based at least in part on each resource output cost measure for the one or more resource fields. In some embodiments, generating the aggregate output resource cost measure may comprise adding the output cost measures for the one or more resource fields associated with the service entry.

At step/operation 1104, the local ledger management computing entity 106 generates the relative resource output cost measure based at least in part on the aggregate input resource cost measure and the aggregate output resource cost measure. In some embodiments, generating the relative resource output cost measure may comprise dividing the aggregate output cost measure by the aggregate input cost measure. The relative resource output cost measure may describe the ratio of the cost of the service fields associated with the service entry as provided to one or more external service recipient entities to the cost of the service fields as provided by one or more external service recipient entities.

Returning to FIG. 7, the process 700 continues when the local ledger management computing entity 106 generates (at step/operation 711) the service endpoint document data object to describe the relative resource output cost measure for the one or more resource fields. In various embodiments, generating the service endpoint document data object to describe the relative resource output cost measure comprise adding the generated relative resource output cost measure to the service endpoint document data object.

The process 700 continues when subsequent to generating the service endpoint document data object to describe the relative resource output cost measure, one or more global ledger monitoring system 105 executes (at step/operation 712) a service endpoint validation chaincode to endorse finalization of the service endpoint document data object. In some embodiments, the service endpoint validation chaincode is configured to assure the following transactions/operations are performed: (i) deduction of the count of resource items added to the service endpoint document data object from the corresponding local resource ledger 117; (ii) addition of the resource input cost measure to the service endpoint document data object as reflected in the local resource ledger 117; (iii) addition of the resource output cost to the service endpoint document data object; and (iv) generation of the relative resource output cost measure based at least on part on a ratio of the resource input cost measure and resource output cost measure Subsequent to finalization of the service endpoint document data object, the local ledger management computing entity 106 provides (at step/operation 713) the relative resource output cost measure to the plurality of segment ledger systems 104. Subsequent to provision of the relative resource output cost measure to each particular segment ledger system 104, one or more of the global ledger monitor systems may be configured to cause the global ledger monitoring system 105 to execute (at step/operation 714) a respective level-specific resource cost validation chaincode to cause updating of a segment-specific relative resource output cost measure for the network segment that is associated with the respective segment ledger system 104, where segment-specific relative resource output cost measure for a particular network segment may describe a statistical distribution (e.g., average and or other centroid measure) of the relative resource output cost measure for the particular network segment taking into account the relative resource output cost measure provided to the segment ledger system 104.

In some embodiments, updating of segment-specific relative resource output cost measure comprise performing operations corresponding to the equation below for each network level:

$$N\_Resource\_Cost = \frac{(D\_Count * I\_Cost) + Resource\_Cost}{D\_Count + 1} \quad \text{Equation 5}$$

In Equation 5, N_Resource_Cost is the updated segment-specific relative resource output cost measure for the particular network level, D_Count is the count (e.g., number) of service endpoint document data objects, I_Cost is the current segment-specific relative resource output cost measure for the particular network level, and Resource Cost is the calculated relative resource output cost measure.

In some embodiments, the respective level-specific resource cost validation chaincode is configured to assure the following transactions/operations are performed: (i) adding the transactions (e.g., relative resource output cost measures) to the respective segment ledger systems 104 (e.g., respective segment ledger) of each network level associated with the local ledger server system 101 and (ii) updating the respective segment ledger systems 104 (e.g., respective segment ledgers) for the network levels to reflect updated segment-specific relative resource output cost measures based at least in part on performing operations corresponding to equation 5 (discussed above).

In various embodiments, each segment ledger may be configured to perform one or more segment management operations based at least in part on the relative resource output cost measures that are maintained by the segment ledger system 104. In some embodiments, the one or more segment management operations may comprise generation and/or updating a user interface configured to display the relative resource output cost measures and/or other data.

Figure 12:
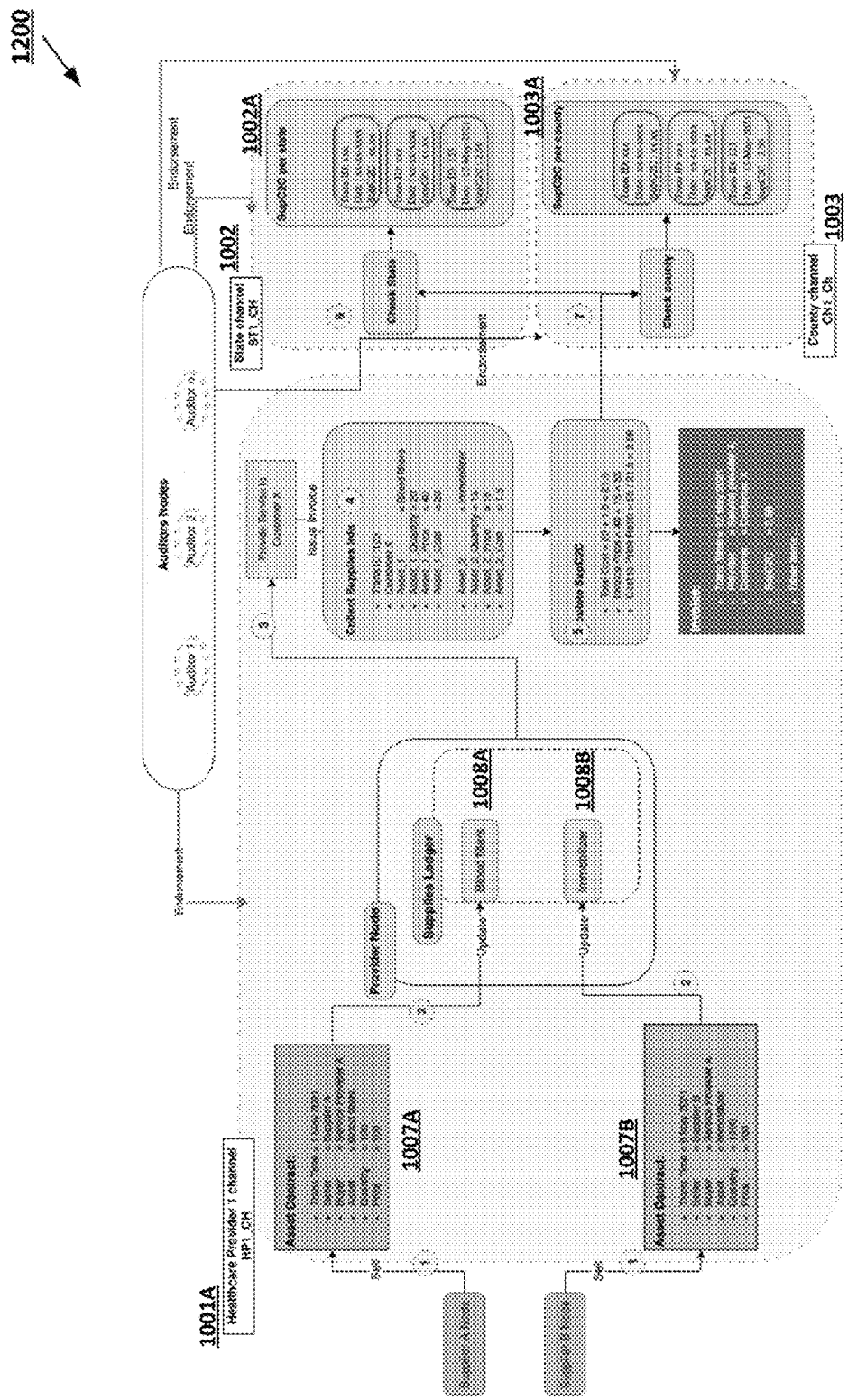
FIG. 12 provides an operational example for updating segment ledgers of a hierarchically-segmented blockchain network in accordance with some embodiments herein.

FIG. 12 provides an operational example for generating relative resource output cost measure and updating the relative resource output cost measure in a segment ledger of a hierarchically-segmented blockchain network in accordance with some embodiments herein. As shown in the operational example 1200 of FIG. 12, each medical service provider channel (e.g., 1001A) stores (e.g., in addition to a local service ledger 116) a plurality of local resource ledgers 117 (e.g., asset ledgers 1008A and 1008B) associated with a particular medical asset. As shown in the operational example of FIG. 12, the depicted medical service provider channel 1001A, in response to receiving smart contract transactional protocol data object (e.g., 1007A and 1007B) (depicted as asset contract) from a medical supplier in connection with the sale of a medical asset, adds data relating to the sale transaction (e.g. cost of the medical asset, quantity, and/or the like) to the resource ledger. In response to providing a medical service to a patient that utilizes a medical asset, a relative service output cost is calculated and added to the service endpoint data object that is provided to the patient. Moreover, an updated relative resource output cost measure (e.g. updated segment-specific relative resource output cost measure) is provided to each segment channel to update the segment ledgers of the segment channels.

Accordingly, as described above, various embodiments of the present invention introduce techniques for efficient and resilient network-wide supervision of a hierarchically-segmented blockchain network. A hierarchically-segmented blockchain network may include S segment ledger systems 104 associated with S network segments and G local ledger systems. In some embodiments, persistent network-wide supervision of such a complex network would either require a single global ledger monitoring system that would persistently communicate with S+G monitored systems, or up to S+G monitoring systems each performing network-wide supervision for a subset of the S+G monitored systems, where the monitoring systems need to be in persistent communications to exchange configuration data. As clear, both solutions involve considerable network overhead which, in addition to using an excessive amount of network resources, increases the probability of network failure given a constant per-packet network failure probability. In contrast, various embodiments of the present invention utilize a centralized global ledger monitoring system that non-persistently monitors the S+G monitored systems via periodic chaincodes that are configured to verify targeted transactions associated with particular local ledgers and/or segment-wise ledgers during particular transactional junctures associated with ledger data. In this way, by enabling targeted monitoring of a hierarchically-segmented blockchain network using a centralized global ledger monitoring system that non-persistently monitors the monitored systems via periodic chaincodes that are configured to verify targeted transactions in particular transactional junctures, various embodiments of the present invention introduce techniques for efficient and resilient network-wide supervision of a hierarchically-segmented blockchain network.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method for enabling low-bottleneck network-wide supervision of a local ledger server system in a hierarchically-segmented blockchain network that is associated with a plurality of network levels, the computer-implemented method comprising:
  identifying, using one or more processors, a plurality of segment ledger systems associated with a plurality of network segments for the local ledger server system, wherein each network segment is associated with a respective network level of the plurality of network levels of the hierarchically-segmented blockchain network;
  identifying, using the one or more processors, a service entry that is associated with one or more service fields, wherein (i) each service field is associated with a service type of a plurality of defined service types, and (ii) each service field is associated with a service output cost measure of one or more service output cost measures associated with the service entry;
  generating, using the one or more processors, a service ledger entry for the service entry in a local service ledger of the local ledger server system;
  subsequent to generating the service ledger entry, using the one or more processors:
    for each service field, receiving, from the plurality of segment ledger systems, a plurality of service output cost distribution measures for the plurality of network levels,
    generating a plurality of relative service output cost measures with respect to the plurality of network levels based at least in part on the plurality of service output cost distribution measures, and
    generating a service endpoint document data object that describes the plurality of relative service output cost measures, wherein, in response to generation of the service endpoint document data object, a global ledger monitoring system in the hierarchically-segmented blockchain network is configured to execute an output cost distribution validation chaincode to endorse the service endpoint document data object and cause generation of a service endpoint ledger entry for the service endpoint document data object in a local service endpoint ledger of the local ledger server system; and
  subsequent to generating the service endpoint ledger entry, providing, using the one or more processors, the one or more service output cost measures to the plurality of segment ledger systems, wherein: (i) in response to receipt of the one or more service output cost measures by a respective segment ledger system, the global ledger monitoring system is configured to execute a respective level-specific service cost validation chaincode to cause updating of segment-wide service output cost distribution measures for each service type that is associated with the service entry with respect to the network segment that is associated with the respective segment ledger system, and (ii) each segment ledger system is configured to perform one or more segment management operations based at least in part on the segment-wide service output cost distribution measures that are maintained by the segment ledger system.

2. The computer-implemented method of claim 1, wherein:
  the computer-implemented method further comprises, in response to determining that the service entry is associated with one or more resource fields, generating the service endpoint document data object to describe a relative resource output cost measure for the one or more resource fields,
  subsequent to generating the service endpoint ledger entry, the global ledger monitoring system is configured to execute a service endpoint validation chaincode to endorse finalization of the service endpoint document data object,
  subsequent to finalization of the service endpoint document data object, the local ledger server system is configured to provide the relative resource output cost measure to the plurality of segment ledger systems, and
  subsequent to provision of the relative resource output cost measure to each particular segment ledger system, the global ledger monitoring system is configured to execute a respective level-specific resource cost validation chaincode to cause updating of a segment-specific relative resource output cost measure for the network segment that is associated with the respective segment ledger system.

3. The computer-implemented method of claim 2, wherein:
  the local ledger server system comprises a plurality of local resource ledgers each associated with a resource type of a plurality of resource types,
  each resource field is associated with a respective resource type, and
  each local resource ledger describes a resource input cost measure for the resource type that is associated with the local resource ledger.

4. The computer-implemented method of claim 3, wherein updating a particular local resource ledger comprises:
  receiving a smart contract transactional protocol data object associated with the resource type that corresponds to the particular local resource ledger; and
  generating a local resource ledger entry in the particular local resource ledger based at least in part on the smart contract transactional protocol data object, wherein, in response to generation of the local resource ledger entry, the global ledger monitoring system is configured to execute a resource receipt validation chaincode to endorse the smart contract transactional protocol data object.

5. The computer-implemented method of claim 3, wherein generating the relative resource output cost measure for the one or more resource fields comprises:
  for each resource field, querying the local resource ledger for the resource type that is associated with the resource field to generate a resource input cost measure for the resource field;
  generating an aggregate input resource cost measure based at least in part on each resource input cost measure;
  generating an aggregate output resource cost measure based at least in part on each resource output cost measure for the one or more resource fields; and
  generating the relative resource output cost measure based at least in part on the aggregate input resource cost measure and the aggregate output resource cost measure.

6. The computer-implemented method of claim 1, wherein generating a particular relative service output cost measure with respect to a particular network level comprises:

for each service field:
    identifying a particular service output cost distribution measure for the service field with respect to the particular network level,
    generating a field-wise output cost ratio for the service field based at least in part on the particular service output cost distribution measure for the service field and the service output cost measure for the service field, and
    generating a field-wise weighted relative output cost measure for the service field based at least in part on the field-wise output cost ratio for the service field and the service output cost measure for the service field; and
  generating the particular relative service output cost measure based at least in part on each field-wise weighted relative output cost measure.

7. The computer-implemented method of claim 1, wherein the local ledger server system is configured to store and maintain the local service ledger, the local service endpoint ledger, and a local resource ledger.

8. An apparatus for enabling low-bottleneck network-wide supervision of a local ledger server system in a hierarchically-segmented blockchain network that is associated with a plurality of network levels, the apparatus comprising one or more processors and at least one memory including program code, the at least one memory and the program code configured to, with the one or more processors, cause the apparatus to at least:
  identify a plurality of segment ledger systems associated with a plurality of network segments for the local ledger server system, wherein each network segment is associated with a respective network level of the plurality of network levels of the hierarchically-segmented blockchain network;
  identify a service entry that is associated with one or more service fields, wherein (i) each service field is associated with a service type of a plurality of defined service types, and (ii) each service field is associated with a service output cost measure of one or more service output cost measures associated with the service entry;
  generate a service ledger entry for the service entry in a local service ledger of the local ledger server system;
  subsequent to generating the service ledger entry:
    for each service field, receive, from the plurality of segment ledger systems, a plurality of service output cost distribution measures for the plurality of network levels,
    generate a plurality of relative service output cost measures with respect to the plurality of network levels based at least in part on the plurality of service output cost distribution measures, and
    generate a service endpoint document data object that describes the plurality of relative service output cost measures, wherein, in response to generation of the service endpoint document data object, a global ledger monitoring system in the hierarchically-segmented blockchain network is configured to execute an output cost distribution validation chaincode to endorse the service endpoint document data object and cause generation of a service endpoint ledger entry for the service endpoint document data object in a local service endpoint ledger of the local ledger server system; and
  subsequent to generating the service endpoint ledger entry, provide the one or more service output cost measures to the plurality of segment ledger systems, wherein: (i) in response to receipt of the one or more service output cost measures by a respective segment ledger system, the global ledger monitoring system is configured to execute a respective level-specific service cost validation chaincode to cause updating of segment-wide service output cost distribution measures for each service type that is associated with the service entry with respect to the network segment that is associated with the respective segment ledger system, and (ii) each segment ledger system is configured to perform one or more segment management operations based at least in part on the segment-wide service output cost distribution measures that are maintained by the segment ledger system.

9. The apparatus of claim 8, wherein:
the at least one memory and the program code further configured to, with the one or more processors, cause the apparatus to at least, in response to determining that the service entry is associated with one or more resource fields, generate the service endpoint document data object to describe a relative resource output cost measure for the one or more resource fields,
subsequent to generating the service endpoint ledger entry, the global ledger monitoring system is configured to execute a service endpoint validation chaincode to endorse finalization of the service endpoint document data object,
subsequent to finalization of the service endpoint document data object, the local ledger server system is configured to provide the relative resource output cost measure to the plurality of segment ledger systems, and
subsequent to provision of the relative resource output cost measure to each particular segment ledger system, the global ledger monitoring system is configured to execute a respective level-specific resource cost validation chaincode to cause updating of a segment-specific relative resource output cost measure for the network segment that is associated with the respective segment ledger system.

10. The apparatus of claim 9, wherein:
the local ledger server system comprises a plurality of local resource ledgers each associated with a resource type of a plurality of resource types,
each resource field is associated with a respective resource type, and
each local resource ledger describes a resource input cost measure for the resource type that is associated with the local resource ledger.

11. The apparatus of claim 10, wherein updating a particular local resource ledger comprises:
receiving a smart contract transactional protocol data object associated with the resource type that corresponds to the particular local resource ledger; and
generating a local resource ledger entry in the particular local resource ledger based at least in part on the smart contract transactional protocol data object, wherein, in response to generation of the local resource ledger entry, the global ledger monitoring system is configured to execute a resource receipt validation chaincode to endorse the smart contract transactional protocol data object.

12. The apparatus of claim 10, wherein generating the relative resource output cost measure for the one or more resource fields comprises:

for each resource field, querying the local resource ledger for the resource type that is associated with the resource field to generate a resource input cost measure for the resource field;

generating an aggregate input resource cost measure based at least in part on each resource input cost measure;

generating an aggregate output resource cost measure based at least in part on each resource output cost measure for the one or more resource fields; and generating the relative resource output cost measure based at least in part on the aggregate input resource cost measure and the aggregate output resource cost measure.

13. The apparatus of claim 8, wherein generating a particular relative service output cost measure with respect to a particular network level comprises:

for each service field:
identifying a particular service output cost distribution measure for the service field with respect to the particular network level,
generating a field-wise output cost ratio for the service field based at least in part on the particular service output cost distribution measure for the service field and the service output cost measure for the service field, and
generating a field-wise weighted relative output cost measure for the service field based at least in part on the field-wise output cost ratio for the service field and the service output cost measure for the service field; and generating the particular relative service output cost measure based at least in part on each field-wise weighted relative output cost measure.

14. The apparatus of claim 8, wherein the local ledger server system is configured to store and maintain the local service ledger, the local service endpoint ledger, and a local resource ledger.

15. A computer program product for enabling low-bottleneck network-wide supervision of a local ledger server system in a hierarchically-segmented blockchain network that is associated with a plurality of network levels, the computer program product comprising at least one non-transitory computer-readable storage medium having computer-readable program code portions stored therein, the computer-readable program code portions configured to:

identify a plurality of segment ledger systems associated with a plurality of network segments for the local ledger server system, wherein each network segment is associated with a respective network level of the plurality of network levels of the hierarchically-segmented blockchain network;

identify a service entry that is associated with one or more service fields, wherein (i) each service field is associated with a service type of a plurality of defined service types, and (ii) each service field is associated with a service output cost measure of one or more service output cost measures associated with the service entry;

generate a service ledger entry for the service entry in a local service ledger of the local ledger server system;

subsequent to generating the service ledger entry:
for each service field, receive, from the plurality of segment ledger systems, a plurality of service output cost distribution measures for the plurality of network levels,
generate a plurality of relative service output cost measures with respect to the plurality of network levels based at least in part on the plurality of service output cost distribution measures, and generate a service endpoint document data object that describes the plurality of relative service output cost measures, wherein, in response to generation of the service endpoint document data object, a global ledger monitoring system in the hierarchically-segmented blockchain network is configured to execute an output cost distribution validation chaincode to endorse the service endpoint document data object and cause generation of a service endpoint ledger entry for the service endpoint document data object in a local service endpoint ledger of the local ledger server system; and subsequent to generating the service endpoint ledger entry, provide the one or more service output cost measures to the plurality of segment ledger systems, wherein: (i) in response to receipt of the one or more service output cost measures by a respective segment ledger system, the global ledger monitoring system is configured to execute a respective level-specific service cost validation chaincode to cause updating of segment-wide service output cost distribution measures for each service type that is associated with the service entry with respect to the network segment that is associated with the respective segment ledger system, and (ii) each segment ledger system is configured to perform one or more segment management operations based at least in part on the segment-wide service output cost distribution measures that are maintained by the segment ledger system.

16. The computer program product of claim 15, wherein:
the computer-readable program code portions further configured to, in response to determining that the service entry is associated with one or more resource fields, generate the service endpoint document data object to describe a relative resource output cost measure for the one or more resource fields, subsequent to generating the service endpoint ledger entry, the global ledger monitoring system is configured to execute a service endpoint validation chaincode to endorse finalization of the service endpoint document data object, subsequent to finalization of the service endpoint document data object, the local ledger server system is configured to provide the relative resource output cost measure to the plurality of segment ledger systems, and subsequent to provision of the relative resource output cost measure to each particular segment ledger system, the global ledger monitoring system is configured to execute a respective level-specific resource cost validation chaincode to cause updating of a segment-specific relative resource output cost measure for the network segment that is associated with the respective segment ledger system.

17. The computer program product of claim 16, wherein:
the local ledger server system comprises a plurality of local resource ledgers each associated with a resource type of a plurality of resource types, each resource field is associated with a respective resource type, and each local resource ledger describes a resource input cost measure for the resource type that is associated with the local resource ledger.

18. The computer program product of claim 17, wherein updating a particular local resource ledger comprises:

receiving a smart contract transactional protocol data object associated with the resource type that corresponds to the particular local resource ledger; and generating a local resource ledger entry in the particular local resource ledger based at least in part on the smart contract transactional protocol data object, wherein, in response to generation of the local resource ledger entry, the global ledger monitoring system is configured to execute a resource receipt validation chaincode to endorse the smart contract transactional protocol data object.

19. The computer program product of claim 17, wherein generating the relative resource output cost measure for the one or more resource fields comprises:

for each resource field, querying the local resource ledger for the resource type that is associated with the resource field to generate a resource input cost measure for the resource field;

generating an aggregate input resource cost measure based at least in part on each resource input cost measure;

generating an aggregate output resource cost measure based at least in part on each resource output cost measure for the one or more resource fields; and generating the relative resource output cost measure based at least in part on the aggregate input resource cost measure and the aggregate output resource cost measure.

20. The computer program product of claim 15, wherein generating a particular relative service output cost measure with respect to a particular network level comprises:

for each service field:
identifying a particular service output cost distribution measure for the service field with respect to the particular network level, generating a field-wise output cost ratio for the service field based at least in part on the particular service output cost distribution measure for the service field and the service output cost measure for the service field, and generating a field-wise weighted relative output cost measure for the service field based at least in part on the field-wise output cost ratio for the service field and the service output cost measure for the service field; and generating the particular relative service output cost measure based at least in part on each field-wise weighted relative output cost measure.

* * * * *